United States Patent
Fuji et al.

[11] Patent Number: 6,125,085
[45] Date of Patent: Sep. 26, 2000

[54] OPTICAL RECORDING METHOD AND DEVICE FOR OPTIMALLY CONTROLLING THE WIDTH OF THE RECORDING MARKS

[75] Inventors: Hiroshi Fuji, Soraku-gun; Tetsuya Okumura, Tenri; Shigemi Maeda, Yamatokoriyama, all of Japan

[73] Assignee: Sharp Kabushiki Kaisha, Osaka, Japan

[21] Appl. No.: 09/108,472

[22] Filed: Jul. 1, 1998

[30] Foreign Application Priority Data

| Jul. 2, 1997 | [JP] | Japan | 9-176651 |
| Oct. 23, 1997 | [JP] | Japan | 9-290838 |
| Jun. 24, 1998 | [JP] | Japan | 10-177402 |

[51] Int. Cl.⁷ .................................................. G11B 11/00
[52] U.S. Cl. ................. 369/13; 369/116; 369/54
[58] Field of Search ................. 369/13, 116, 54, 369/14, 58; 360/59, 114; 365/122

[56] References Cited

U.S. PATENT DOCUMENTS

| 5,060,208 | 10/1991 | Nagai et al. ............................... 369/13 |
| 5,398,227 | 3/1995 | Miyaoka et al. .......................... 369/116 |
| 5,475,666 | 12/1995 | Ito et al. ................................... 369/54 |
| 5,485,433 | 1/1996 | Satomura et al. .......................... 369/13 |
| 5,587,975 | 12/1996 | Kobayashi ................................. 369/13 |
| 5,604,725 | 2/1997 | Fuji . |
| 5,617,400 | 4/1997 | Fuji . |
| 5,684,765 | 11/1997 | Matsumoto et al. ....................... 369/13 |
| 5,726,954 | 3/1998 | Matsumoto et al. ....................... 369/13 |
| 5,732,061 | 3/1998 | Kirino et al. ............................. 369/116 |
| 5,825,724 | 10/1998 | Matsumoto et al. ....................... 369/13 |
| 5,831,943 | 11/1998 | Kurita et al. .............................. 369/13 |

FOREIGN PATENT DOCUMENTS 9-16965  1/1997  Japan .

*Primary Examiner*—Tan Dinh
*Attorney, Agent, or Firm*—David G. Conlin; David A. Tucker

[57] ABSTRACT

A method and apparatus are provided for optimally controlling the width of recording marks formed by a light beam on an optical recording medium in an optical recording apparatus. The method is accomplished by selecting and storing in a storage device a predetermined optimal read signal value, and then setting a plurality of selectable predetermined recording conditions in the optical recording apparatus. These conditions differ from one another in the quantity of light in the light beam, or in the strength of an external magnetic field. In the optical recording apparatus, a set of first test patterns then are recorded by the light beam on separate first tracks of the optical recording medium under each of the predetermined conditions. Similarly, a second test track is recorded onto the optical recording medium under the same predetermined conditions adjacent to each of the first test tracks. The first test tracks are thereafter read by the optical recording apparatus, and the amplitude of the read signals is stored in the storage device, along with an indication of the predetermined recording signal condition under which it was generated. Finally, using a comparison device, the stored signal quantities are compared to the predetermined optimal read signal value. The optimal one of the predetermined recording conditions to be used by the optical recording apparatus is determined to be the condition associated with the one of the stored signals that most closely approximates the predetermined optimal signal value.

43 Claims, 18 Drawing Sheets

F I G. 4
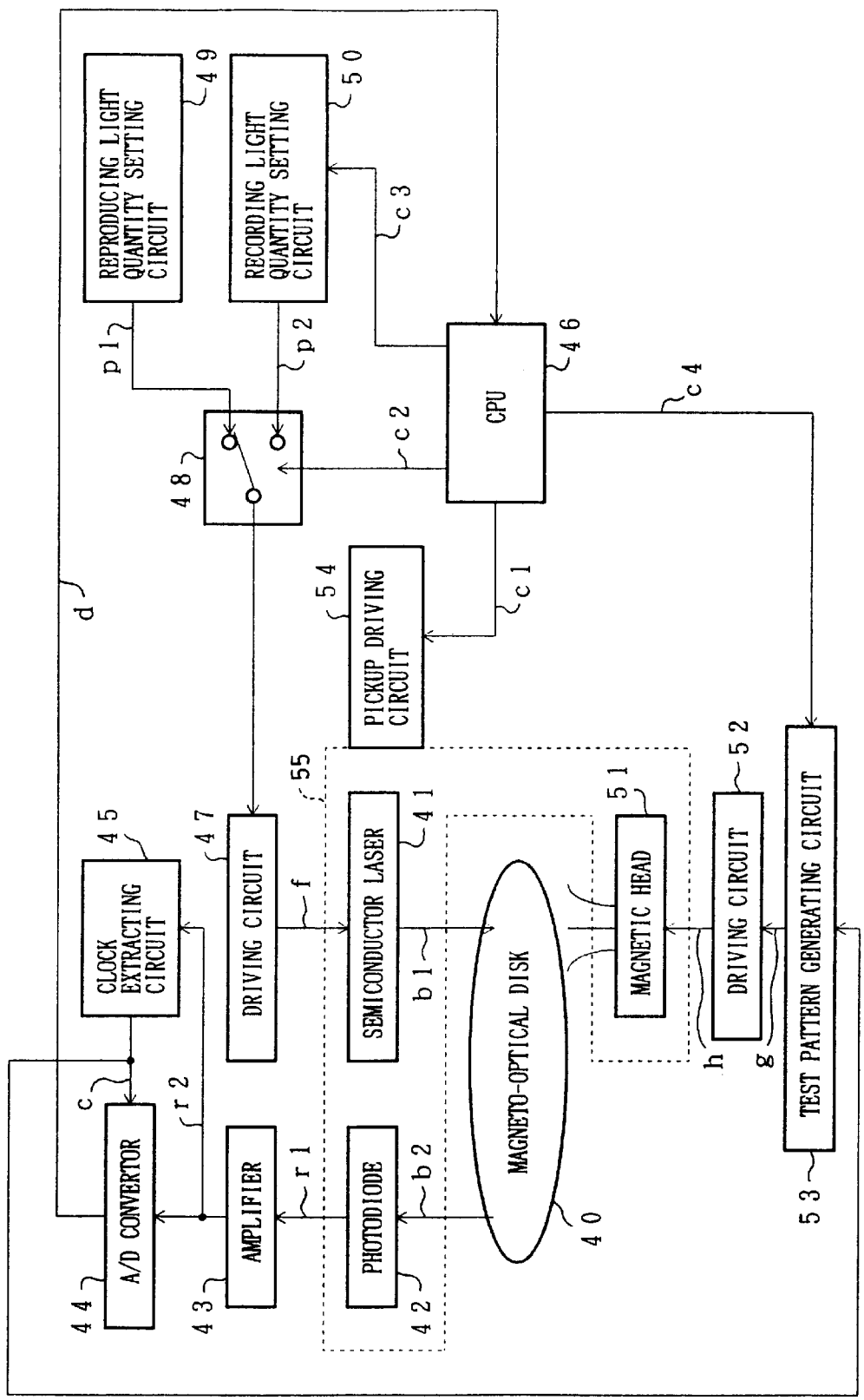

FIG. 18 (a) PRIOR ART
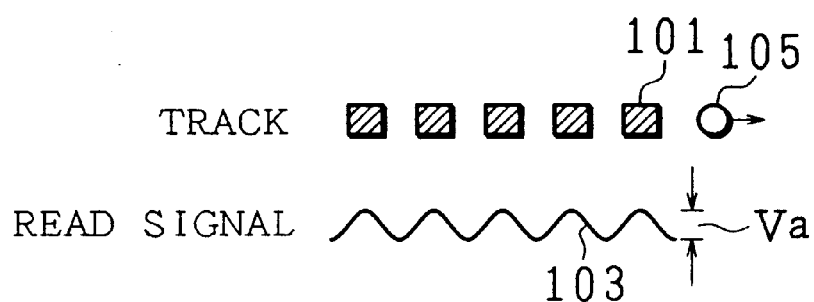
FIG. 18 (b) PRIOR ART
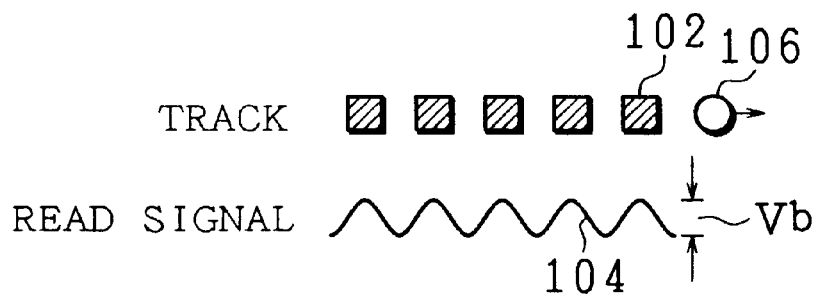

OPTICAL RECORDING METHOD AND DEVICE FOR OPTIMALLY CONTROLLING THE WIDTH OF THE RECORDING MARKS

FIELD OF THE INVENTION

The present invention relates to a recording condition control method, a recording condition control device, and an optical recording medium for optimizing recording conditions for an optical recording apparatus which records information by projecting a light beam to an optical recording medium or by applying a magnetic field thereto, which conditions include a recording light quantity of a light beam, or a strength of a recording magnetic field of an external magnetic field.

BACKGROUND OF THE INVENTION

Recently, further eagerer study than before has been made for high-densification of an optical disk. In the case where recording conditions such as a recording light quantity of a light beam projected to an optical disk or a recording magnetic field strength of an external magnetic field applied to a magneto-optical recording disk vary, a size of a record mark accordingly varies, thereby causing uniform recording to be failed, and as a result high-density recording is hardly possible.

Therefore, the Japanese Publication for Laid-Open Patent Application No. 16965/1997 (Tokukaihei 9-16965), for example, discloses a device for optimizing a recording light quantity of a light beam at an ON time by doing the following controlling operation, which device is for use in a so-called light modulation recording apparatus wherein data is recorded by ON/OFF of the light beam.

First, the recording light quantity is gradually increased, while record marks are recorded at each time. Then, each record mark becomes longer as the recording light quantity increases, and a so-called duty, which is a ratio of the record marks to portions other than the record mark, varies. The variation of the duty is easily recognized by detecting a DC component of a reproduction signal. Therefore, a recording light quantity which corresponds to such a record mark that the duty becomes 1:1 is found among the record marks recorded with a recording light quantity which gradually alters, and the light quantity thus found is selected an optimal light quantity. By doing so, the record marks always have optimal lengths. The foregoing device performs such recording light quantity control.

Such a light modulation recording apparatus, however, has the following drawback. A change in the size of the record mark in a lengthwise direction (a direction along a track) appears in the duty, whereas a change in the size of the record mark in a width direction (a direction orthogonal to the track) which is orthogonal to the lengthwise direction does not appear therein. Therefore, the width of the record mark cannot be optimized.

More specifically, with the conventional apparatus, narrow record marks 101 are recorded by a light beam 105 with a small recording light quantity, as shown in FIG. 18(a). On the other hand, as shown in FIG. 18(b), wider record marks 102 than the record marks 101 are recorded by a light beam 106 with a greater recording light quantity. However, such variation of the width of the record marks does not appear in respective duties of recording signals 103 and 104. For this reason, conventionally, controlling the width of the record marks to an appropriate value was impossible. As a result, the width of the record marks varied, and crosstalk upon reproduction of a signal which occurred as high-densification of recording tracks was furthered, or crosserase upon recording of a signal (erasure of ends of record marks due to effusion of record from an adjacent track), could not be minimized, thereby making it impossible to arrange tracks at a higher density.

On the other hand, instead of the light modulation recording, a so-called magnetic field modulation recording whereby data are recorded by reversing an external magnetic field may be executed in a recording operation with respect to a magneto-optical disk. In this case, the recording light quantity is constant, not being turned ON/OFF.

As for the magnetic field modulating recording, narrow record marks 101 are recorded, as shown in FIG. 18(a), in the case where a recording light quantity of a light beam is small or a strength of a recording magnetic field is small. On the other hand, as shown in FIG. 18(b), wide record marks 102 are recorded in the case where the recording light quantity of the light beam is great or the strength of the recording magnetic field is great. Here, the lengths of the record marks 101 and 102 are determined in accordance with a reversing position of the recording magnetic field, and do not depend on the recording light quantity or the recording magnetic field strength. Therefore, by appropriately controlling the reversion of the external magnetic field, record marks with appropriate lengths are precisely recorded. In this aspect, the magnetic field modulation recording differs from the light modulation recording.

However, in the case of the magnetic field modulation recording as well, a change in the width of the record marks does not appear in the duty at all. Therefore, any change in the record mark width could be detected, and hence, to control the width of the record marks was impossible.

SUMMARY OF THE INVENTION

The object of the present invention relates to provide a recording condition control method, a recording condition control device, and an optical recording medium for an optical recording apparatus, with which, in the light modulation recording or the magnetic field modulation recording wherein only a width of record marks varies, a width of record marks are optimally controlled and crosstalk occurring between tracks upon signal reproduction or crosserase upon signal recording are minimized so that high densification of tracks may be realized.

To achieve the above object, a recording condition control method of the present invention for an optical recording apparatus is characterized by comprising the steps of (1) setting a plurality of recording conditions differing in a light quantity of a light beam or a strength of an external magnetic field, (2) recording a test pattern on an optical recording medium under the different recording conditions, (3) reading the test pattern and detecting an amplitude of a read signal with respect to each recording condition, and (4) determining an optimal recording condition based on the amplitudes which are respectively obtained with respect to the recording conditions, wherein said step (2) includes the sub-steps of (2a) recording a first test pattern on a first track of the optical recording medium, and (2b) recording a second test pattern on at least one of two second tracks adjacent to the first track.

Under recording conditions differing in the light quantity of the light beam or the strength of the external magnetic field, record marks with widths respectively according to the recording conditions are recorded on the optical recording medium. The variation of the width of the record marks appears as variation of the amplitude of the read signal with respect to the record marks.

Therefore, by the aforementioned method, it is possible to obtain an optimal recording condition also in the magnetic field modulation recording in which only the width of the record marks varies, since the amplitude of the read signal is detected with respect to each recording condition and the optimal recording condition is determined based on the amplitudes obtained. As a result, crosstalk occurring between tracks upon signal reproduction and crosserase due to adjacent tracks upon signal recording are minimized, whereby high-densification of tracks can be realized.

Furthermore, a recording condition control device of the present invention for use in an optical recording apparatus is characterized by comprising (1) recording condition setting means for setting a plurality of recording conditions by varying a recording light quantity of a light beam or a strength of a recording magnetic field, (2). recording means for recording a test pattern on an optical recording medium by projecting said light beam onto said optical recording medium under a predetermined recording condition, (3) amplitude detecting means for reading the test pattern with respect to each recording condition, and detecting each amplitude of a read signal, and (4) optimal recording condition determining means for determining an optimal recording condition, based on the amplitudes which are respectively detected with respect to the recording conditions, wherein (i) said recording means records a first test pattern on a first track on said optical recording medium under a predetermined recording condition, and records a second test pattern on at least one of two second tracks adjacent to the first track under the same predetermined recording condition, and (ii) said amplitude detecting means reads the first test pattern with respect to each recording condition.

Widths of the record marks respectively correspond to amplitudes of the record signal. With the aforementioned arrangement, therefore, it is possible to obtain an optimal record mark width and an optimal recording condition in the magnetic field modulation recording as well in which only the width of the record marks varies, since the optimal recording condition is determined based on the amplitudes respectively obtained with respect to the recording conditions. As a result, crosstalk occurring between tracks upon signal reproduction and crosserase due to adjacent tracks upon signal recording are minimized, whereby high-densification of tracks may be realized.

Furthermore, an optical recording medium of the present invention is characterized by comprising (1) a test pattern record region used for optimally controlling a recording light quantity of a light beam or a recording magnetic field strength of an external magnetic field, and (2) reference marks used for generating an external clock, wherein the test pattern record region is sectioned by the reference marks.

With the foregoing arrangement, it is possible to precisely record a test pattern on the test pattern record region, in accordance with the external clock. With this, an optimal recording condition is more accurately detected, thereby enhancing the aforementioned effect.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a block diagram illustrating a schematic arrangement of a recording condition control device of the present invention for use in an optical recording apparatus.

FIG. 18(a) is an explanatory view about a conventional recording condition control method, which illustrates record marks recorded on a predetermined track by projecting thereto a light beam having a small recording light quantity and a read signal of the record marks.

FIG. 18(b) is an explanatory view about the conventional recording condition control method, which illustrates record marks recorded on the predetermined track by projecting thereto a light beam having a greater recording light quantity than that of the light beam of FIG. 18(a) and a read signal of the record marks.

DESCRIPTION OF THE PREFERRED EMBODIMENTS

First Embodiment

Figure 1:
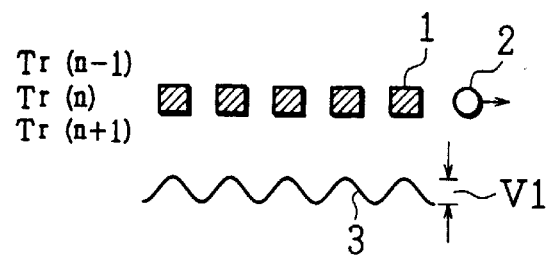
FIG. 1(a) is an explanatory view illustrating record marks recorded by projecting a light beam with a small recording light quantity with respect to a predetermined track, and a read signal of the record marks.
FIG. 1(b) is an explanatory view illustrating the record marks and the read signal after an erasing operation with respect to tracks adjacent to the predetermined track wherein light beams each having a light quantity equal to that of the foregoing light beam are projected to the adjacent tracks.
FIG. 1(c) is an explanatory view illustrating record marks recorded by projecting to the predetermined track a light beam with a greater recording light quantity than that of the foregoing light beam, and a read signal of the record marks.
FIG. 1(d) is an explanatory view illustrating the record marks and the read signal after an erasing operation with respect to tracks adjacent to the predetermined track wherein light beams each having a light quantity equal to that of the light beam of FIG. 1(c) are projected to the adjacent tracks.
FIG. 1(e) is an explanatory view illustrating record marks recorded by projecting to the predetermined track a light beam with a greater recording light quantity than that of the light beam of FIG. 1(c), and a read signal of the record marks.
FIG. 1(f) is an explanatory view illustrating the record marks and the record signal after an erasing operation with respect to tracks adjacent to the predetermined track wherein light beams each having a light quantity equal to that of the light beam of FIG. 1(e) are projected to the adjacent tracks.
Figure 1:
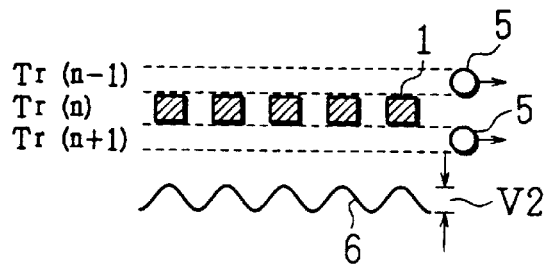
Figure 1:
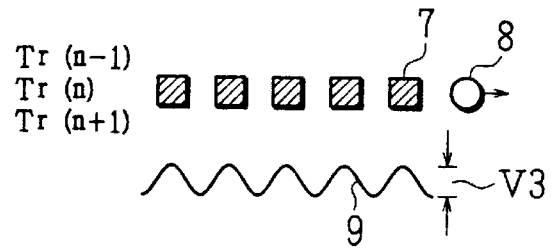
Figure 1:
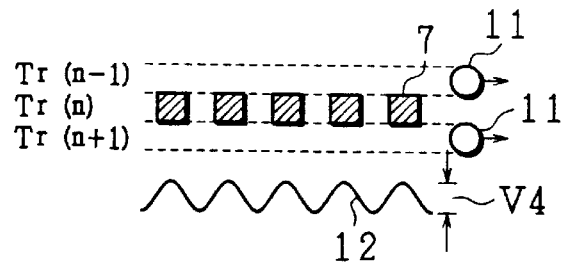
Figure 1:
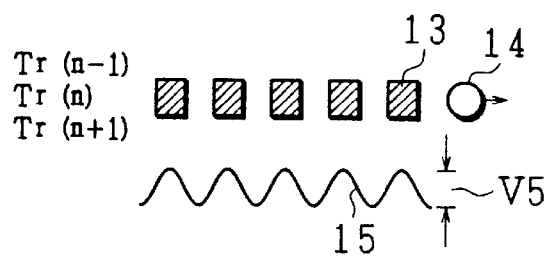
Figure 1:
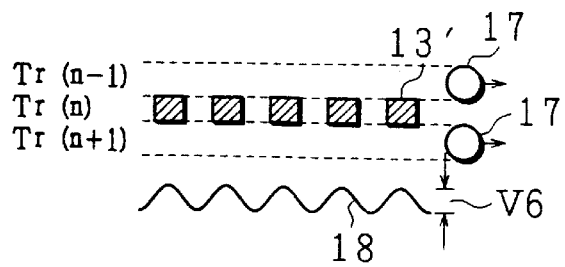

The following description will explain an embodiment of the present invention while referring to FIGS. 1(a) through 1(f) and FIG. 2.

Recently, a technique for improving recording density by the so-called super-resolution effect has been developed. The super-resolution effect is an effect which is obtained when a light beam is projected to an optical recording medium having a reproduction layer and a recording layer on a substrate in such a manner that a detection aperture smaller than a light spot of the light beam is obtained on the reproduction layer. As an example of this, the so-called magnetic super-resolution is well known, in which a portion of the reproduction layer which has a higher temperature due to the projection of the light beam is magnetically coupled with the recording layer and becomes a detection aperture used for reading out recorded information. Since temperature distribution of the detection aperture herein is determined by a thermal capacity of an optical recording medium, ambient temperature, and the like, it is necessary to optimally control the size of the detection aperture at all times by controlling a reproduction light quantity.

For example, an apparatus disclosed by the Japanese Publication for Laid-Open Patent Application No. 63817/1996 (Tokukaihei 8-63817), i.e., the U.S. Pat. No. 5,617,400, has (1) signal quantity detecting means for detecting a reproduction signal quantity from short marks among marks recorded on the optical recording medium, the short mark being smaller than a detection aperture, and a reproduction signal quantity from long marks which are larger than the detection aperture, and (2) control means for controlling a reproduction light quantity so that a ratio between the reproduction signal quantities from the short and long marks approximates to a predetermined value. Besides, reproduction control patterns composed of the long and short marks are cyclically recorded between neighbor information record regions, and by reproducing the patterns, control of the reproduction light quantity is always stably performed.

The following description will take as an example the recording light quantity control with respect to the optical recording medium of the magnetic super-resolution. For conveniences' sake, the following description will explain a case of optimization of the recording light quantity in the magnetic field modulation recording. Optimization of the strength of the recording magnetic field will be briefly explained in a last part, since it can be explained substantially in the same manner. Therefore, the following description will explain a method for finding an optimal recording light quantity by keeping the recording magnetic field strength constant while varying the recording light quantity.

The easiest method for optimizing a width of record marks is a method of detecting, based on a reproduction signal quantity, to what extent end portions of record marks on a predetermined track are erased and the width thereof is decreased due to an erasing operation with respect to tracks adjacent to a target track, which erasing operation also slightly extends to the target track (such erasure is hereinafter referred to as over-erasure).

First, as shown in FIG. 1(a), a light beam 2 with a small recording light quantity is projected to a track Tr(n) (first track) while a recording magnetic field is reversed, so that record marks 1 are recorded. Here, each record mark 1 has a width narrower than the track width, and hence an amplitude V1 of a read signal 3 which is obtained when reading the record marks 1 is small.

Next, as shown in FIG. 1(b), by using light beams having a recording light quantity equal to that of the light beam 2, an erasing operation is applied to tracks Tr(n−1) and Tr(n+1) (second tracks) adjacent to the track Tr(n). In a case of the land/groove recording as used for high-density recording, the track Tr(n) is a groove while the tracks Tr(n−1) and Tr(n+1) are lands, for example. An erasing width is substantially equal to that of the record mark 1, and hence regions of the width shown by broken lines are subjected to erasure. Since the erasing width here is narrow as well, erasure of end portions of the record marks 1 does not occur. An amplitude V2 of a read signal 6 obtained when reading out the record marks 1 is equal to the amplitude V1.

The aforementioned operation is repeated as the recording light quantity is gradually increased, and then, the width of the record marks 1 and the width of the erased regions shown by the broken lines are gradually widened, and sides thereof approaches to each other. As shown in FIG. 1(c), record marks 7 are recorded on the track Tr(n) by a light beam 8 with a greater recording light quantity than that of the light beam 5, and as shown in FIG. 1(d), an erasing operation is carried out with respect to the tracks Tr(n−1) and Tr(n+1) by using light beams 11 with a light quantity equal to that of the light beam 8, whereby end (side) portions of the erased regions come into contact with end portions of the record marks 7. Here, the width of the record marks 7 becomes maximum, and there does not occur over-erasure due to the erasing operation with respect to the tracks Tr(n−1) and Tr(n+1). Therefore, the same amplitude V3 of the read signal 9 of FIG. 1(c) remains unchanged, equal to the amplitude V4 of the read signal 12 of FIG. 1(d), having a maximum value.

As the recording light quantity is further increased, however, the end portions of the record marks 7 become erased by over-erasure due to the erasing operation with respect to the adjacent tracks, and the record marks are gradually narrowed. As shown in FIG. 1(e), recording is performed by projecting to the track Tr(n) a light beam 14 with a greater recording light quantity than that of the light beam 11, whereby record marks 13 wider than the track width are recorded. An amplitude V5 of a read signal 15 which is obtained when the read marks 13 are read is great.

Subsequently, as shown in FIG. 1(f), an erasing operation by light beams 17 each having a recording light quantity equal to that of the light beam 14 is applied to the tracks Tr(n−1) and Tr(n+1). A width of each region subjected to the erasing operation is substantially equal to that of the width of the record marks 13, the regions being shown by broken lines. Since each erased region is wide, end portions of the record marks 13 are erased and only center portions thereof remain. The remaining portions of the record marks 13 are referred to as record marks 13'. Herein, since the record marks 13' have a narrow width, an amplitude V6 of a read signal 18 obtained by reading the record marks 13' is remarkably smaller than that of the amplitude V5.

Figure 2:
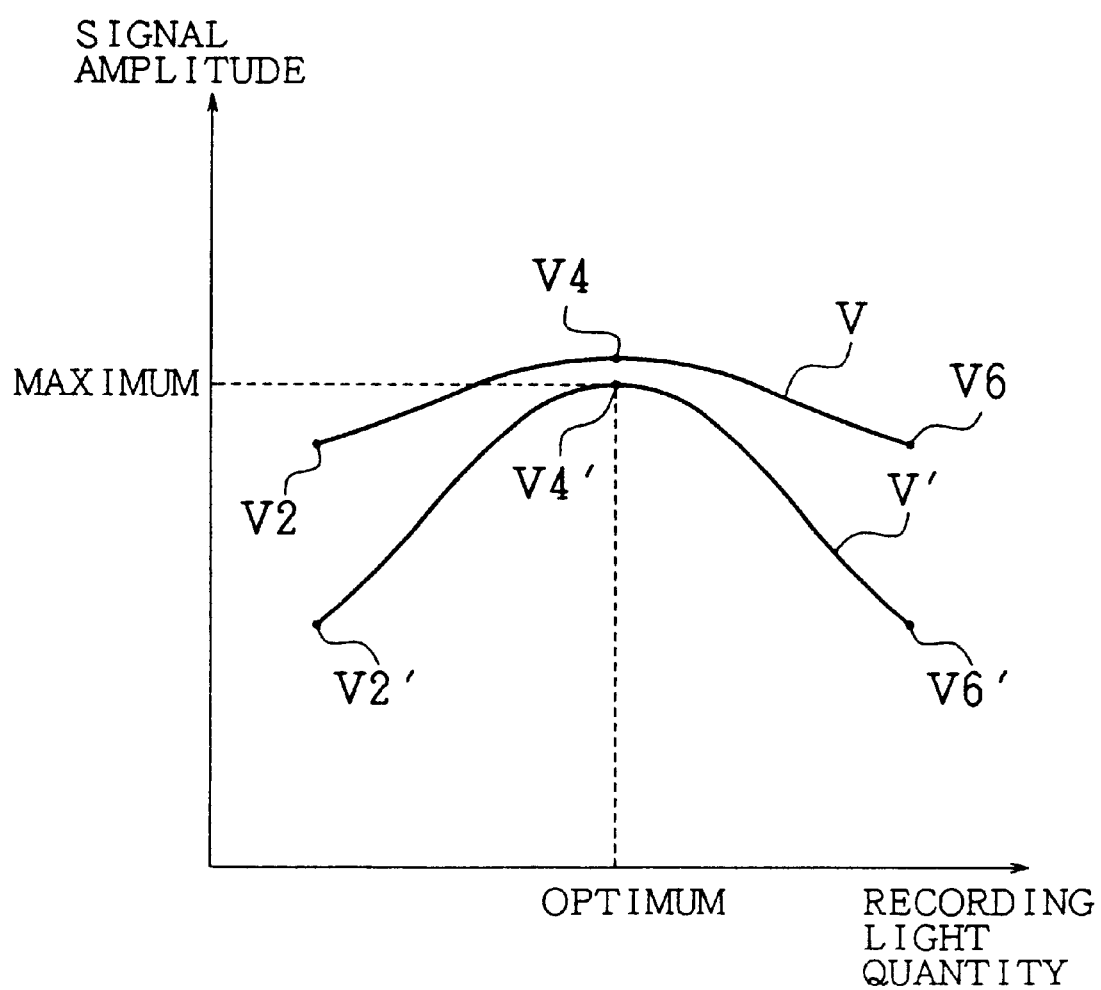
FIG. 2 is a graph showing signal amplitudes of read signals which change in response to changes of a recording light quantity, so as to explain detection sensitivity of signal amplitudes.

FIG. 2 plots the amplitude of the read signal after the erasing operation with respect to the adjacent tracks, which varies with the increasing recording light quantity as shown in FIGS. 1(b), 1(d), and 1(f). When the recording light quantity is small, the signal amplitude V is small, whereas the signal amplitude V increases as the recording light quantity increases. Then, after the sides of the record marks and the sides of the erased regions come into contact, the end portions of the record marks become erased as the recording light quantity increases, and the signal amplitude V in turn decreases. Therefore, with such a recording light quantity as causes the signal amplitude to become maximum, the record marks have a maximum width, with the end portions thereof not erased. Thus, by repeating the foregoing operation while gradually increasing the recording light quantity, the recording light quantity which causes the signal amplitude V to become maximum is found so as to be used as the optimal recording light quantity.

By detecting changes in the width of the record marks based on changes in the amplitude of the read signal, the recording light quantity is optimally controlled. In the case of the magnetic field modulation recording, the recording light quantity is optimized with high sensitivity, since only the width of the record marks varies with the recording light quantity.

To optimize the recording magnetic field strength, the foregoing operation is repeated with the recording light quantity kept constant, while the recording magnetic field strength is gradually increased. By doing so, the width of the record marks is optimally controlled, according to changes in the amplitude of the read signal.

Second Embodiment

The following description will explain another embodiment of the present invention, while referring to FIGS. 2 through 7. The members having the same structure (function) as those in the first embodiment will be designated by the same reference numerals and their description will be omitted.

The method explained in the description on the first embodiment is a method for easily controlling the width of the record marks, wherein the over-erasure caused by the erasing operation with respect to the adjacent tracks is detected by detecting the amplitude of the read signal. The method, however, has a drawback in that sensitivity for detecting the maximum value is poor since the signal amplitude V varies not greatly, as shown in FIG. 2. Therefore, in the present embodiment, the signal amplitude is caused to vary greatly, so that the maximum value is detected with high sensitivity. The following description will explain a method for detecting the maximum value in this manner, while referring to FIGS. 3(a) through 3(g).

As shown in FIG. 3(a), wide record marks 20 are previously recorded on the tracks Tr(n−1) and Tr(n+1) by using light beams 21 each having a great recording light quantity. Here, the recording is performed in accordance with a recording clock of an external crock method which will be described later. Patterns of the record marks 20 are identical to those obtained by reversing a pattern to be recorded on the track Tr(n) which will be described later. Hereinafter the patterns recorded on the tracks Tr(n−1) and Tr(n+1) are referred to as reverse patterns while the pattern recorded on the track Tr(n) is referred to as non-reverse pattern.

As shown in FIG. 3(b), the recording magnetic field is reversed while a light beam 23 with a small recording light quantity is projected on the track Tr(n), so that record marks 22 forming the non-reverse pattern are recorded. Here, since the non-reverse pattern is recorded in accordance with the recording clock of the external clock method which will described later, the recording is performed in synchronization with the reverse patterns on the adjacent tracks. Since the record marks 22 have a narrow width each, a read signal 24 has a small amplitude V1'. Furthermore, since the record marks 20 forming the reverse patterns are recorded on the tracks Tr(n−1) and Tr(n+1), signal components of the record marks 22 are decreased by crosstalk upon reproduction, thereby causing the signal amplitude V1' to become further smaller.

Subsequently, as shown in FIG. 3(c), reverse patterns are recorded on the tracks Tr(n−1) and Tr(n+1) by using light beams 26 each having a recording light quantity equal to that of the light beam 23. A width of a recorded region shown by broken lines of each pattern is approximately equal to that of the record mark 22, and as a result record marks 25 each having a width equal to the width of the recorded region are recorded. Since the record marks 25 are recorded in accordance with the recording clock of the external clock method, the record marks 25 fall exactly on the record marks 20 which have previously been recorded. Since the width of the recorded regions on the adjacent tracks is narrow, the end portions of the record marks 22 are by no means erased. Moreover, on the adjacent tracks, the record marks 25 by no means spread to areas outside the previously-recorded record marks 22. Therefore, an amplitude V2' of a read signal 27 is equal to the amplitude V1' of the read signal 24. As described, as the record marks 22 have a smaller width each, the signal amplitude V2' becomes smaller, and as the record marks 20 on the adjacent tracks have a greater width each, the signal amplitude V2' becomes further smaller. In other words, the tendency that the signal amplitude decreases as the recording light quantity is smaller is further intensified by crosstalk of the reverse patterns on the adjacent tracks.

As the above operation is repeated while the recording light quantity is gradually increased, the width of the record marks 22 and the width of the record marks 25 are gradually increased, resulting in that corners of them approaches to each other. As shown in FIG. 3(d), record marks 28 are recorded on the track Tr(n) by using a light beam 29 having a recording light quantity greater than that of the light beam 26. Then, as shown in FIG. 3(e), record marks 31 forming the reverse patterns are recorded on the tracks Tr(n−1) and Tr(n+1) by using light beams 32 each having a recording light quantity equal to that of the light beam 29, with corners of the record marks 31 brought into contact with corners of the record marks 28. Therefore, a signal amplitude V3' of a read signal 30 of FIG. 3(d) and a signal amplitude V4' of a read signal 33 of FIG. 3(e) become equal to each other. Here, the record marks 28 have the greatest width among the record marks recorded on the track Tr(n), whereas the record marks 31 have the smallest width among the record marks recorded on the tracks Tr(n−1) and Tr(n+1) . Therefore, signal components of the record marks 28 are greater than those of any other record mark on the track Tr(n), whereas crosstalk components caused by the adjacent tracks are smaller than those of any other cases, thereby causing the signal amplitude V4' of the read signal 33 to become maximum.

In the case where the recording light quantity is increased, however, end portions of the record marks 28 are erased, whereby the width thereof gradually decreases. Further, each width of the record marks on the tracks Tr(n−1) and Tr(n+1) increases, thereby causing crosstalk to increase. As shown in FIG. 3(f), a non-reverse pattern is recorded on the track Tr(n) by projecting thereto a light beam 35 having a recording light quantity greater than that of the light beam 32, whereby record marks 34 wider than the track width are recorded. An amplitude V5' of a read signal 36 obtained by reading the record marks 34 is great.

Subsequently, as shown in FIG. 3(g), record marks 37 forming reverse patterns are recorded on the tracks Tr(n−1) and Tr(n+1) by using light beams 38 each having a reading light quantity equal to that of the light beam 35. Each record mark 37 have a width equal to that of the record marks 34. Since recorded regions of the reverse patterns are wide, end portions of the record marks 34 are erased in the magnetic field modulation recording, and only center portions thereof remain, which are referred to as record marks 34'. Since the record marks 34' are narrow, an amplitude V6' of a read signal 39 obtained by reading the record marks 34' decreases. Furthermore, signal components of the record marks 34' are decreased by crosstalk caused by the record marks 37 on the adjacent tracks, thereby causing the signal amplitude V6' to become further smaller. In other words, the tendency that the signal amplitude decreases due to crosserase when the recording light quantity is great is further intensified by crosstalk caused by the reverse patterns of the adjacent tracks.

FIG. 2 is a graph of the amplitude V' of the read signal which varies as shown in FIGS. 3(c), 3(e), and 3(g). The signal amplitude V' when the recording light quantity is small is far smaller than the amplitude V shown in FIGS. 1(a) through 1(f). This is because components of the record marks in the non-reverse pattern are reduced by crosstalk caused by the reverse patterns on the adjacent tracks. As the recording light quantity is increased, the record marks are widened, and the crosstalk is further reduced. As a result, the signal amplitude V' is gradually increased, approximating to the signal amplitude V. When ends (sides) of a recorded region of the non-reverse pattern in a recording direction and ends (sides) of recorded regions of the reverse patterns come into contact, the signal amplitude V' becomes maximum. In other words, with such a recording light quantity as causes the signal amplitude V' to become maximum, the record marks become widest, while crosstalk caused by the adjacent tracks becomes smallest. As the recording light quantity is further increased, the end portions of the record marks are gradually erased more and more while the record marks on the adjacent tracks are widened, whereby the signal amplitude V' considerably decreases. Therefore, the recording light quantity which causes the signal amplitude V' to become maximum is used as the optimal recording light quantity.

Thus, by recording the reverse patterns on the adjacent tracks, the signal amplitude is caused to vary more greatly, as compared with the method shown in FIGS. 1(a) through 1(f). By doing so, it is possible to detect with high sensitivity that the signal amplitude becomes maximum.

Next, the following description will explain a device for the controlling operation shown in FIGS. 3(a) through 3(g) for optimizing the recording light quantity, while referring to FIG. 4.

First of all, while recording a test record pattern, a control command c3 is sent from a CPU 46 (optimal recording condition determining means, control means) to a recording light quantity setting circuit 50 (recording condition setting means), and a recording light quantity control signal p2 is outputted from the recording light quantity setting circuit 50.

The recording light quantity control signal p2 is sent through a switch circuit 48 to a driving circuit 47, in response to a switch command c2 supplied from the CPU 46. In response to a driving current f outputted from the driving circuit 47, a strong laser beam b1 is projected by a semi-conductor laser 41 (projecting means) to a magneto-optical disk 40. Simultaneously, a control command c4 is sent from the CPU 46 to a test pattern generating circuit 53, where record signals g of the non-reverse patterns and the reverse patterns shown in FIGS. 3(*a*) through 3(*g*) are generated. When the record signals g are supplied to the driving circuit 52, a recording magnetic field is generated by a magnetic head 51 (recording condition setting means) in response to a driving current h from the driving circuit 52, and the non-reverse pattern and the reverse patterns are recorded on the magneto-optical disk 40.

The following description will explain detection of an amplitude of a read signal. In response to the switch command c2 from the CPU 46, a reproducing light quantity control signal p1 supplied from a reproducing light quantity setting circuit 49 is sent through the switch circuit 48 to the driving circuit 47, and in response to the driving current f from the driving circuit 47, a weak laser beam b1 is projected by the semiconductor laser 41 to the magneto-optical disk 40. A reflected light b2 is guided to a photodiode 42. A read signal r1 read from the magneto-optical disk 40 is amplified by an amplifier 43, and a read signal (reproduction signal) r2 obtained through the amplification is supplied to an A/D converter 44 and a clock extracting circuit 45 (clock generating means). The clock extracting circuit 45 produces from the reproduction signal r2 an external clock c which will be described later, and sends it to the test pattern generating circuit 53. By doing so, the non-reverse pattern and the reverse patterns on the adjacent tracks are recorded in a synchronizing manner. The external clock c is also sent to the A/D converter 44, where the read signal r2 is converted to a digital signal d. The digital signal d is sent to the CPU 46, where an amplitude of the read signal r2 is detected. Therefore, the photodiode 42, the amplifier 43, the A/D converter 44, and the CPU 46 constitute amplitude detecting means (or signal quantity detecting means).

The photodiode 42, the semiconductor laser 41, and the magnetic head 51 are installed in a pickup 55 (recording means), which is indicated by a broken line in the figure. When a control command c1 is sent from the CPU 46 to a pickup driving device 54 (tracking means), the pickup driving device 54 drives the pickup 55 so that the light beam b1 is moved and projected to the track Tr(n), and the tracks Tr(n−1) and Tr(n+1) adjacent to the track Tr(n), shown in FIGS. 3(*a*) through 3(*g*).

The CPU 46 sends the control command c3 to cause the recording light quantity to gradually increase, sends the control command c1 to cause the light beam to move to a predetermined track or tracks adjacent to the predetermined track, and sends the control command c4 to cause the non-reverse pattern or the reverse pattern to be recorded. The CPU 46 also uses the control command c2 to set the output of the light beam b1 to the reproducing light quantity, so that the signal amplitude of the read signal r2 is detected based on the digital signal d supplied thereto. The CPU 46, then, sequentially records a signal amplitude with respect to each recording light quantity, and finds such a recording light quantity as causes the signal amplitude to become maximum, so that it is used as the optimal recording light quantity.

Figure 5:
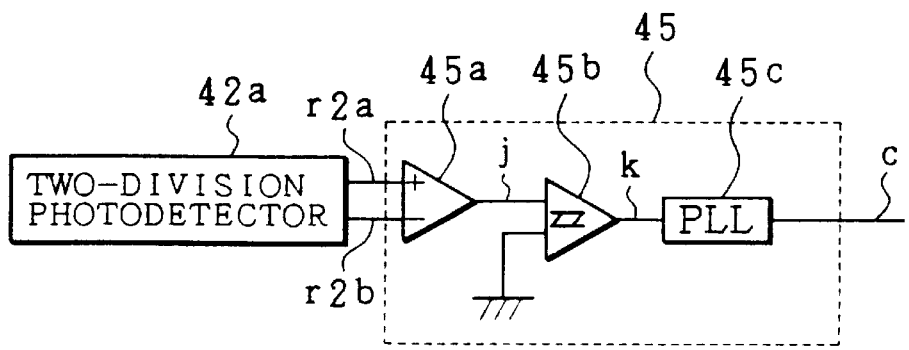
FIG. 5(a) is a block diagram illustrating a detailed arrangement of a clock extracting circuit shown in FIG. 4.
FIG. 5(b) is an explanatory view illustrating position relationship between a test pattern record region and reference marks.
FIG. 5(c) is a waveform chart illustrating respective waveforms of a track error signal, a reference mark detection signal, and an external clock.
Figure 5:
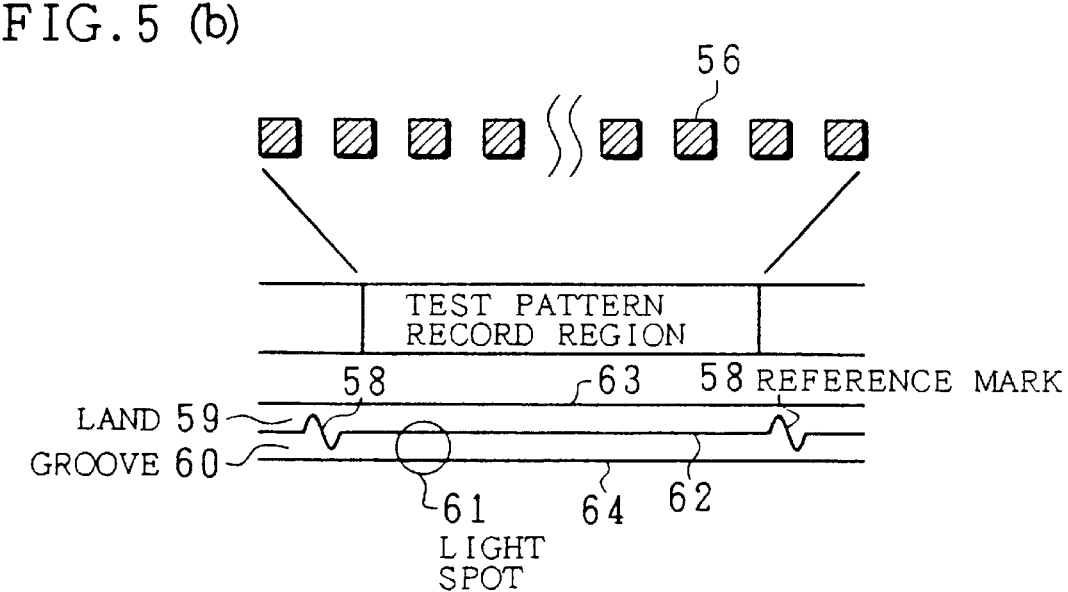
Figure 5:
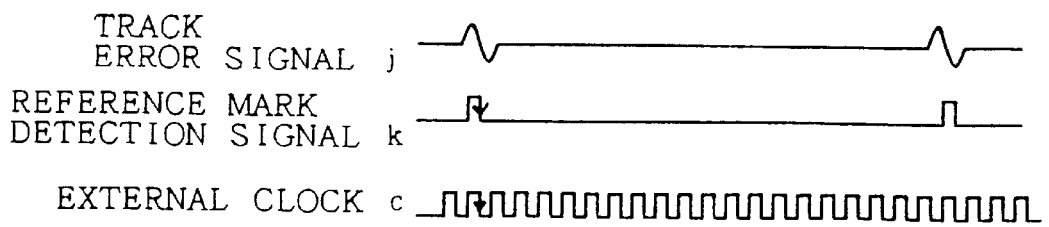

FIG. 5(*a*) is a view explaining the clock extracting circuit 45 shown in FIG. 4 in more detail. The reflected light b2 from the magneto-optical disk 40 enters a two-division photodetector 42*a*. By sending two output signals r2*a* and r2*b* to a differential amplifier 45*a* in the clock extracting circuit 45, a track error signal j of the well-known push-pull method is obtained. The track error signal j contains a read signal from a reference mark 58 which will be described later. To detect the reference mark 58, a hysteresis comparator 45*b* compares the track signal j and a ground level, to produce a reference mark detection signal k. The hysteresis comparator 45*b* supplies the reference mark detection signal k thus obtained to a PLL circuit 45*c*, and the PLL circuit 45*c* outputs the external clock c in synchronization with the reference mark 58.

FIGS. 5(*b*) and 5(*c*) are waveform charts for explaining an operation of the clock extracting circuit 45 shown in FIG. 5(*a*). In FIG. 5(*b*), the non-reverse pattern and the reverse pattern are recorded on tracks, that is, a land 59 and a groove 60. Here, for conveniences' sake, let the track Tr(n) and the track Tr(n−1) be the groove 60 and the land 59, respectively, and the track Tr(n+1) is omitted. In a direction along the tracks, the reference mark 58 and a test pattern record region 57 are alternately provided. In the test pattern record region 57, record marks 56 including the non-reverse pattern and the reverse pattern are recorded. A side wall between the land 59 and the groove 60 is cyclically wobbled, whereby the reference marks 58 indicating physical reference positions on the magneto-optical disk are indelibly recorded. By wobbling only the side wall between the land 59 and the groove 60 while not wobbling opposite side walls 63 and 64, crosstalk with reference marks (not shown) adjacent to each other in a direction orthogonal to the tracks is reduced. Sections divided by the reference marks 58 are used as units in which the test pattern record regions 57 are respectively provided.

For example, when the groove 60 is tracked by a light spot 61, read signals of the reference marks 58 are contained in the track error signal j as shown in FIG. 5(*c*). Then, by converting it to a binary signal, the reference mark detection signal k is obtained. The reference mark detection signal k is supplied to the PLL circuit 45*c*, where the external clock c in synchronization with the reference marks 58 is obtained.

Figure 3:
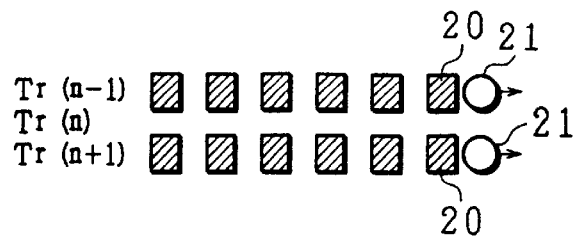
FIG. 3(a) is an explanatory view illustrating record marks recorded in a reverse pattern on tracks adjacent to a predetermined track, by projecting thereto light beams each having a great recording light quantity.
FIG. 3(b) is an explanatory view illustrating record marks recorded in a non-reverse pattern on the predetermined track by projecting a light beam having a small recording light quantity thereto, and a read signal of the record marks, as well as the foregoing record marks on the adjacent tracks.
FIG. 3(c) is an explanatory view illustrating record marks recorded in a reverse pattern on the adjacent tracks by projecting thereto light beams each having a recording light quantity equal to that of the above light beam, as well as the record marks on the predetermined track and the read signal thereof.
FIG. 3(d) is an explanatory view illustrating record marks recorded in a non-reverse pattern on the predetermined track by projecting thereto a light beam having a recording light quantity greater than that of the light beam of FIG. 3(b), and a read signal of the record marks, as well as the record marks on the adjacent tracks.
FIG. 3(e) is an explanatory view illustrating record marks recorded in a reverse pattern on the adjacent tracks by projecting thereto light beams each having a recording light quantity equal to that of the light beam of FIG. 3(d), as well as the record marks on the predetermined track and the read signal thereof.
FIG. 3(f) is an explanatory view illustrating record marks recorded in a non-reverse pattern on the predetermined track by projecting thereto a light beam having a recording light quantity greater than that of the light beam of FIG. 3(d), and a read signal of the record marks, as well as the record marks on the adjacent tracks.
FIG. 3(g) is an explanatory view illustrating record marks recorded in a reverse pattern on the adjacent tracks by projecting light beams each having a recording light quantity equal to that of the light beam of FIG. 3(e), and a read signal of the record marks, as well as the record marks on the adjacent tracks.
Figure 3:
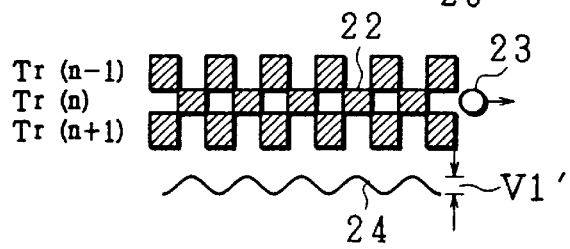
Figure 3:
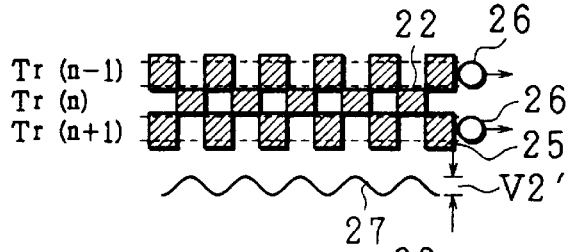
Figure 3:
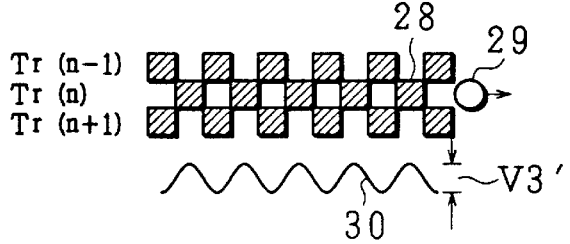
Figure 3:
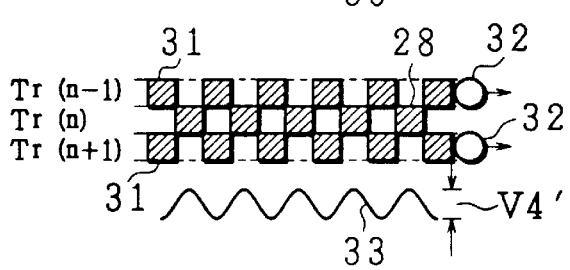
Figure 3:
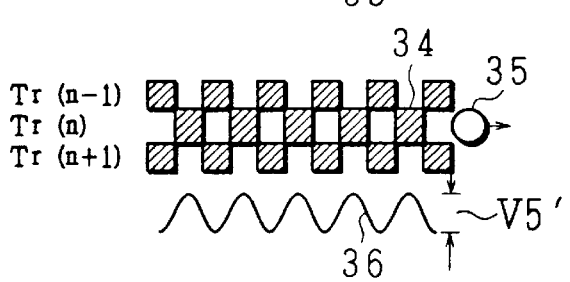
Figure 3:
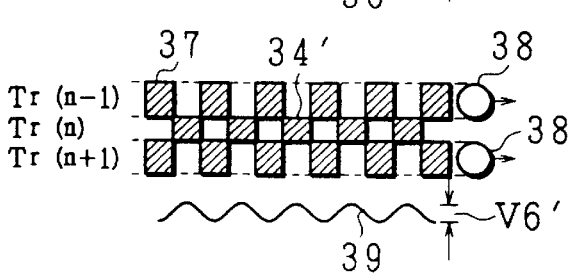
Figure 6:
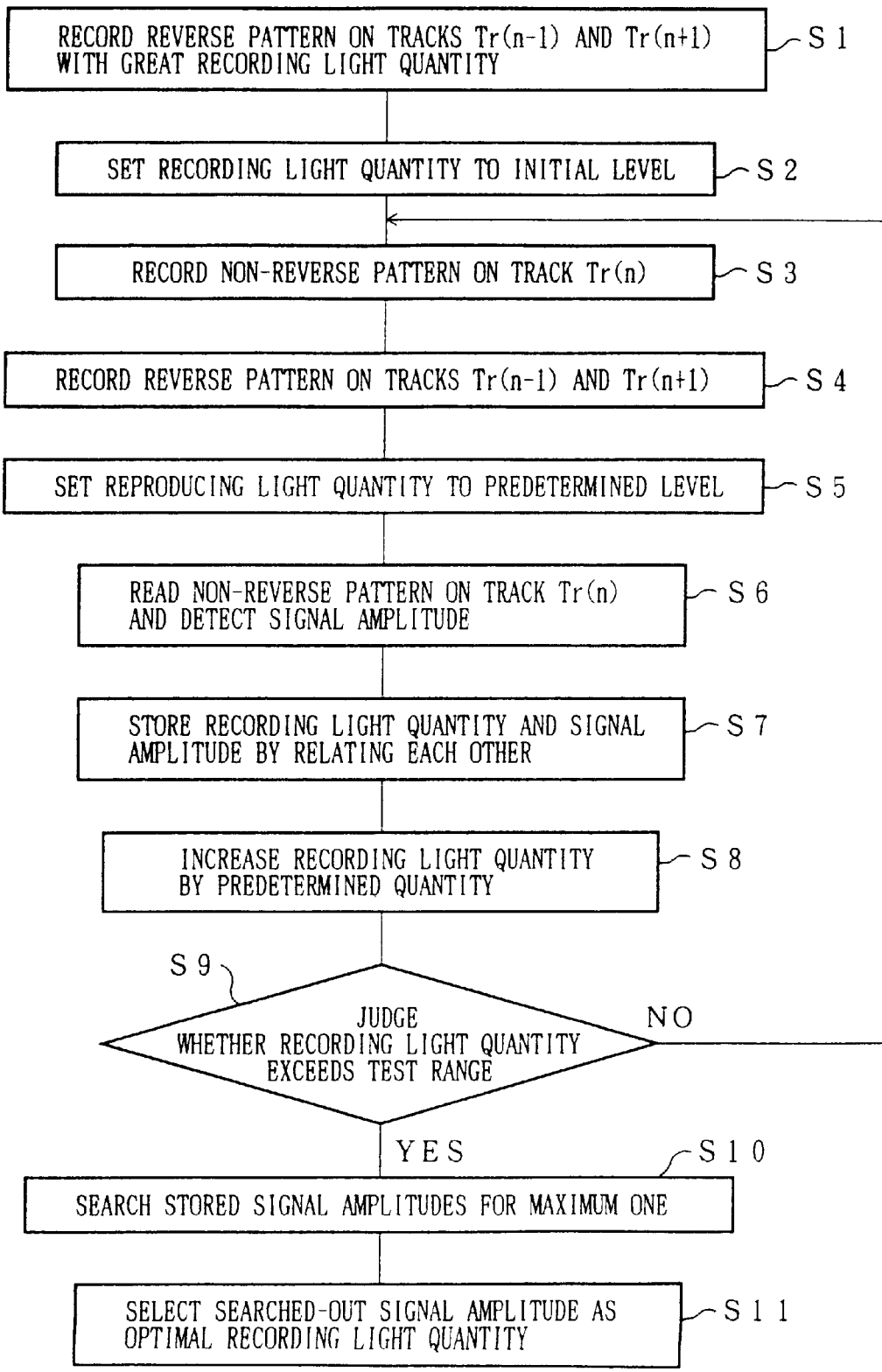
FIG. 6 is a flowchart illustrating a flow of the recording condition control shown in FIGS. 3(a) through 3(g)

FIG. 6 is a flowchart showing the recording condition setting process shown in FIGS. 3(*a*) through 3(*g*). To begin with, the reverse patterns are recorded with a great recording light quantity on the tracks Tr(n−1) and Tr(n+1) (S1). The recording light quantity is set to a low initial level (S2). The non-reverse pattern is recorded on the track Tr(n) with the recording light quantity thus set at S2 (S3). The reverse pattern is recorded on the tracks Tr(n−1) and Tr(n+1) with the same recording light quantity (S4). The light quantity is set to a predetermined reproducing light quantity (S5). The non-reverse pattern on the track Tr(n) is read, so that a signal amplitude is detected (S6). A combination of the recording light quantity and the signal amplitude in this case is stored (S7). The recording light quantity is increased by a predetermined quantity (S8). Whether or not the recording light quantity exceeds an upper limit of a test range is checked (S9). In the case where it is found at S9 that the recording light quantity does not exceed the upper limit, the flow returns to S3, and again the non-reverse pattern is recorded. In the case where it is found at S9 that the recording light quantity exceeds the upper limit, a maximum signal amplitude is searched for among the recorded signal amplitudes (S10). The recording light quantity in combination with the maximum signal amplitude is selected as the optimal recording light quantity (S11).

Figure 7:
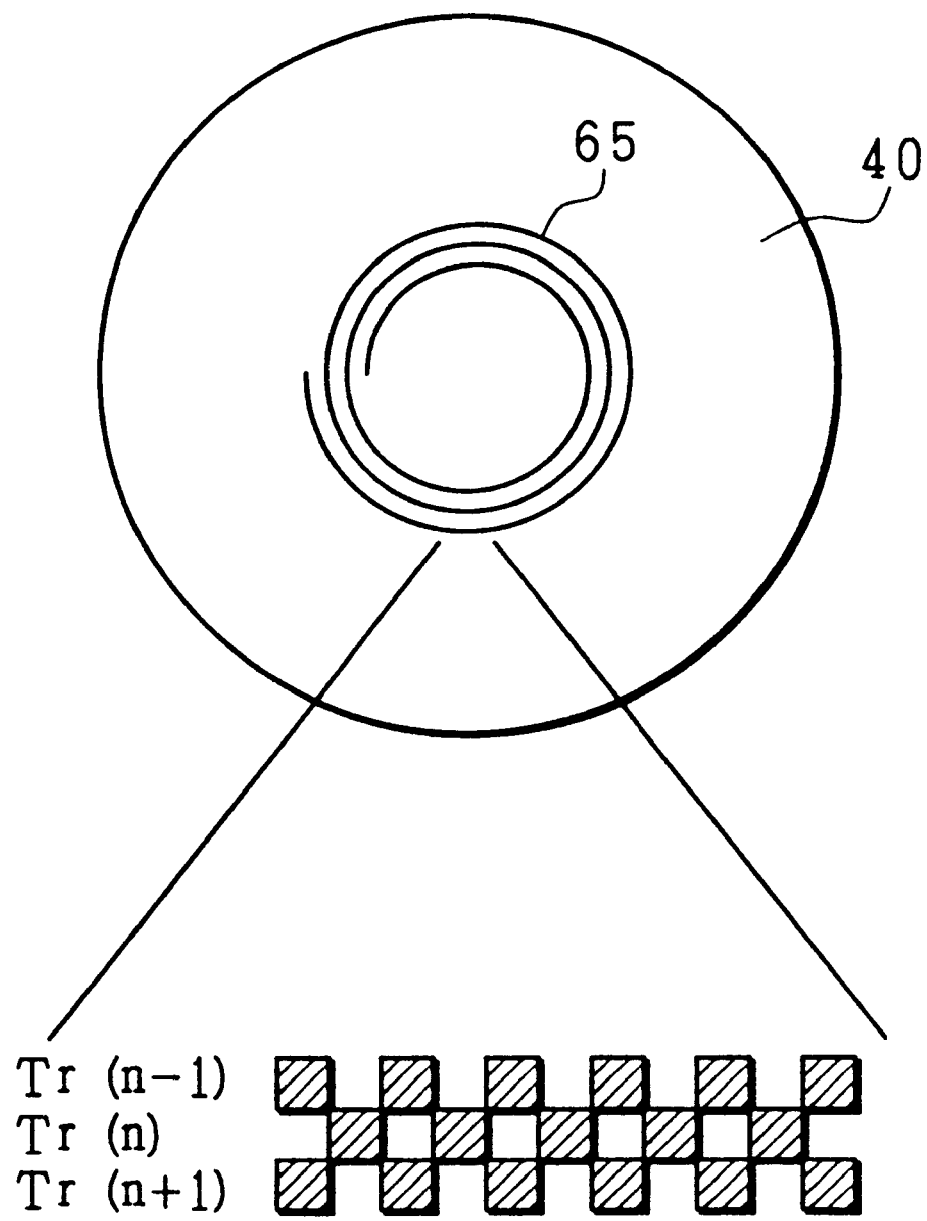
FIG. 7 is an explanatory view illustrating an optical recording medium of the present invention, and record marks recorded on a predetermined track and tracks adjacent thereto on the optical recording medium.

FIG. 7 is a view explaining how tracks are arranged on the magneto-optical disk used in the aforementioned recording condition control process. In a part 65 of a lead-in region of the magneto-optical disk 40, a track region which is used for the recording condition control is disposed. Here, a plurality of tracks disposed side by side are allocated to the track region, and in the case of the land/groove recording, a plurality of tracks continuously disposed side by side, irrespective of land or groove, are allocated. In the track region, at least the reference mark and the test pattern record region are provided on the plurality of tracks continuously disposed. Then, by recording the non-reverse pattern and the reverse pattern in this region while sequentially altering the light quantity, the optimal recording light quantity can be found by high sensitivity.

It should be noted that in the above description the method and device for finding the optimal recording light quantity are explained, but the same can apply to optimization of the recording magnetic field strength. Besides, in the explanation the magnetic field modulation recording is taken as an example, but the optimal recording light quantity can be determined with high sensitivity in the light modulation recording as well, since changes in the width of the record marks can be detected based on the signal amplitude in this case as well.

Third Embodiment

Figure 8:
FIG. 8(a) is an explanatory view illustrating record marks recorded in a reverse pattern on a predetermined track by projecting thereto a light beam having a great recording light quantity.
FIG. 8(b) is an explanatory view illustrating record marks recorded in a reverse pattern on tracks adjacent to the predetermined track by projecting thereto light beams each having a great recording light quantity, and the record marks on the predetermined track.
FIG. 8(c) is an explanatory view illustrating record marks recorded in a non-reverse pattern on the predetermined track by projecting thereto a light beam having a small recording light quantity, and a read signal of the record marks, as well as the record marks on the adjacent tracks.
FIG. 8(d) is an explanatory view illustrating record marks recorded in a reverse pattern on the adjacent tracks by projecting thereto light beams each having a recording light quantity equal to that of the light beam of FIG. 8(c), as well as the record marks on the predetermined track and the read signal.
Figure 8:
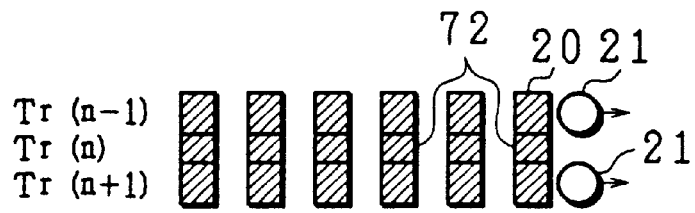
Figure 8:
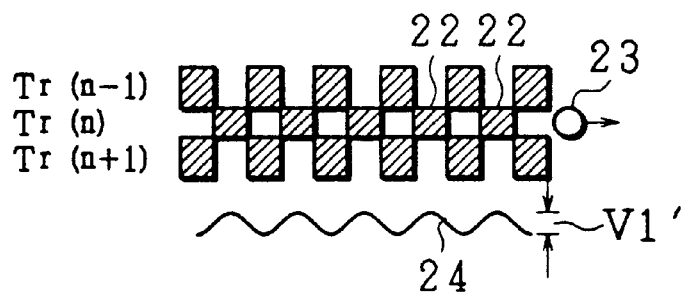
Figure 8:
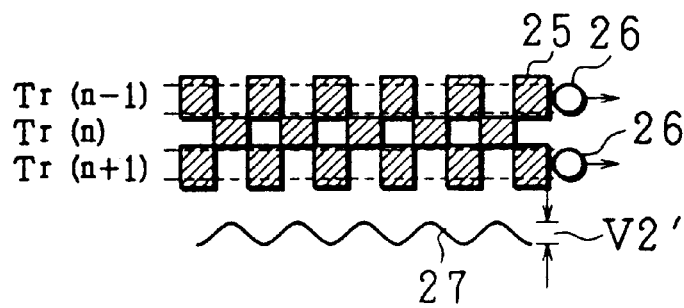

The following description will explain still another embodiment of the present invention, while referring to FIGS. 8(*a*) through 8(*d*), 9, and 10. The members having the same structure (function) as those in the first and second embodiments will be designated by the same reference numerals and their description will be omitted.

In the description on the second embodiment, the method and device for detecting changes in the signal amplitude with high sensitivity by previously recording reverse patterns on the adjacent tracks. The following description on the present embodiment will explain a method for detecting changes in the signal amplitude with further higher sensitivity.

As shown in FIG. 8(*a*), wide record marks 70 are previously recorded on the track Tr(n) by using a light beam 71 with a great recording light quantity. Here, since only remaining of the record marks after an erasing operation, which will be described later, is intended, any light quantity is acceptable provided that it is not extremely small. It is however preferable that wide record marks are recorded with a greater recording light quantity than usual, as described above. It should be noted that the record marks 70 form a reverse pattern.

The process ensuing the step shown in FIG. 8(*b*) is identical to that in the second embodiment. Specifically, as shown in FIG. 8(*b*), wide record marks 20 are recorded on the tracks Tr(n−1) and Tr(n+1) with light beams 21 each having a greater recording light quantity. The record marks 20 form reverse patterns. As a result, end portions of the wide record marks 70 previously recorded on the track Tr(n) are erased, thereby becoming record marks 72 having a smaller width.

Subsequently, as shown in FIG. 8(*c*), record marks 22 forming a non-reverse pattern are recorded on the track Tr(n) by projecting thereto a light beam 23 with a small recording light quantity. Here, focusing the track Tr(n), the record marks 22 of the non-reverse pattern are overwritten on the record marks 72 of the reverse pattern shown in FIG. 8(*b*). As shown in FIG. 8(*c*), in the case where the recording light quantity is small, the reverse pattern tends to remain even after the overwriting operation, and the signal amplitude V1′ of the non-reverse pattern is decreased due to the remaining components. The decreased quantity is greater as the recording light quantity is small whereby the remaining portions are greater, and as a pattern of the remaining portions is closer to the reverse patterns.

Then, as shown in FIG. 8(*d*), record marks 25 forming reverse patterns are recorded on the tracks Tr(n−1) and Tr(n+1) by using light beams 26 each having a recording light quantity equal to that of the light beam 23.

Figure 9:
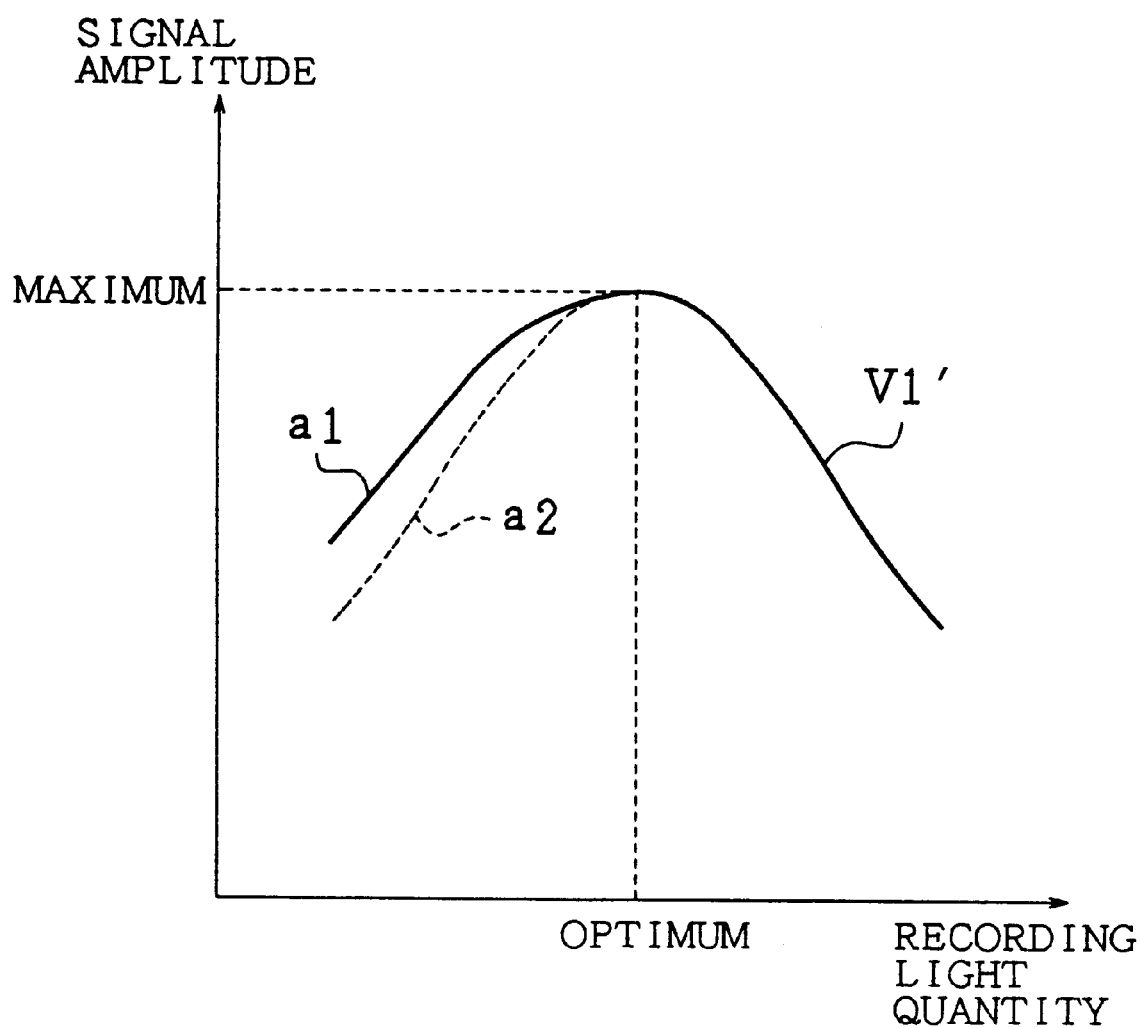
FIG. 9 is a graph illustrating how the signal amplitude of the read signal varies with the recording light quantity, so as to explain a difference in signal amplitude detection sensitivity in the case where remains exist and in the case where they do not exist.

Here, referring to FIG. 9, the following description will explain the decrease of the signal amplitude V1′ described above. The signal amplitude V1′ gradually increases, as indicated by a solid line a1, as the recording light quantity is increased, in the case where the reverse pattern is not previously recorded on the track Tr(n) (as in the second embodiment). In contrast, in the case where the reverse pattern is previously recorded on the track Tr(n), the signal quantity is further decreased in comparison with that in the second embodiment, as indicated by a broken line a2 in FIG. 9, due to the reverse pattern remaining after the overwriting, if the recording light quantity is small. This shows that the pattern more greatly remains as the recording light quantity is smaller, thereby causing the signal amplitude to drastically decrease. Therefore, as compared with the case where the reverse pattern is not previously recorded on the track Tr(n), the variation of the signal amplitude becomes greater, whereby the optimal recording light quantity can be detected with higher sensitivity.

Incidentally, in the case where reverse patterns are not recorded on the adjacent tracks Tr(n−1) and Tr(n+1) and a reverse pattern is previously recorded on the track Tr(n), the identical effect that the variation of the signal amplitude becomes greater can be achieved.

Figure 10:
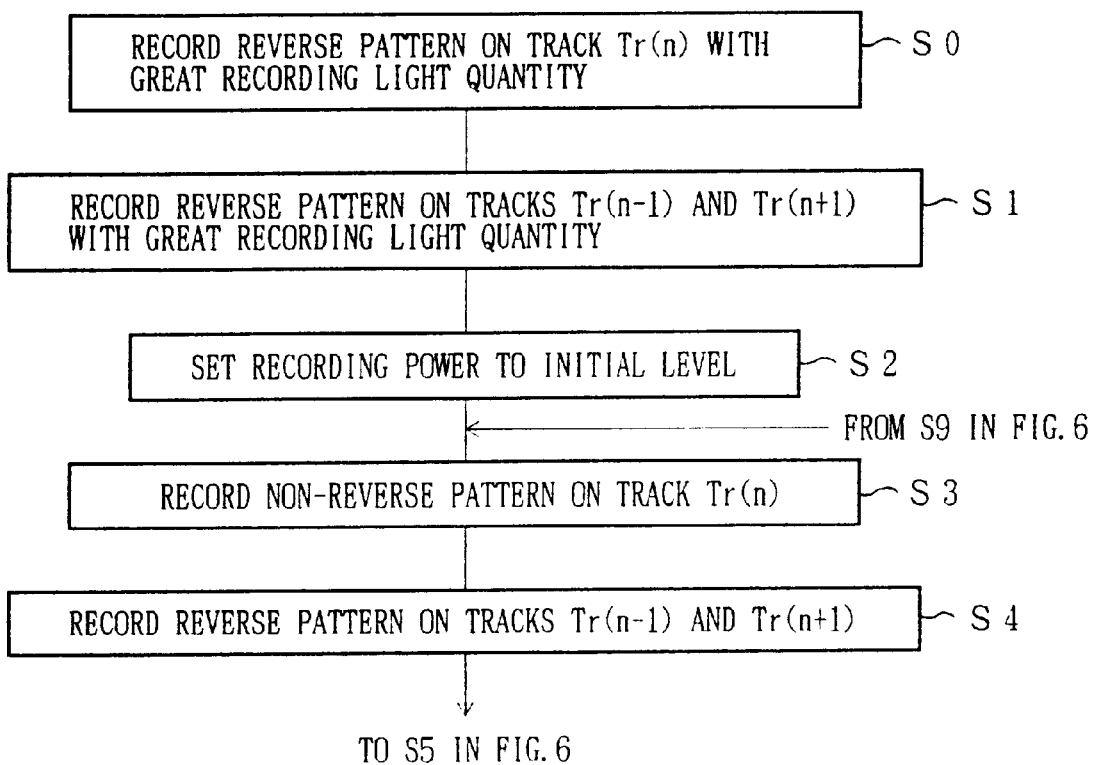
FIG. 10 is a flowchart illustrating a flow of the recording condition control shown in FIGS. 8(a) through 8(d).

FIG. 10 is a flowchart explaining a recording condition control process shown in FIGS. 8(*a*) through 8(*d*). To begin with, a reverse pattern is previously recorded on the track Tr(n) with a great recording light quantity (SO). Then, reverse patterns are recorded on the tracks Tr(n−1) and Tr(n+1) with a great recording light quantity (S1). The recording light quantity is set to a low, initial level (S2). A non-reverse pattern is recorded on the track Tr(n) (S3). Reverse patterns are recorded on the tracks Tr(n−1) and Tr(n+1) with a recording light quantity equal to that for the above non-reverse pattern (S4). The process ensuing to the step S4 is identical to the process after the step S5 of the flowchart in FIG. 6 for the second embodiment.

Fourth Embodiment

Figure 11:
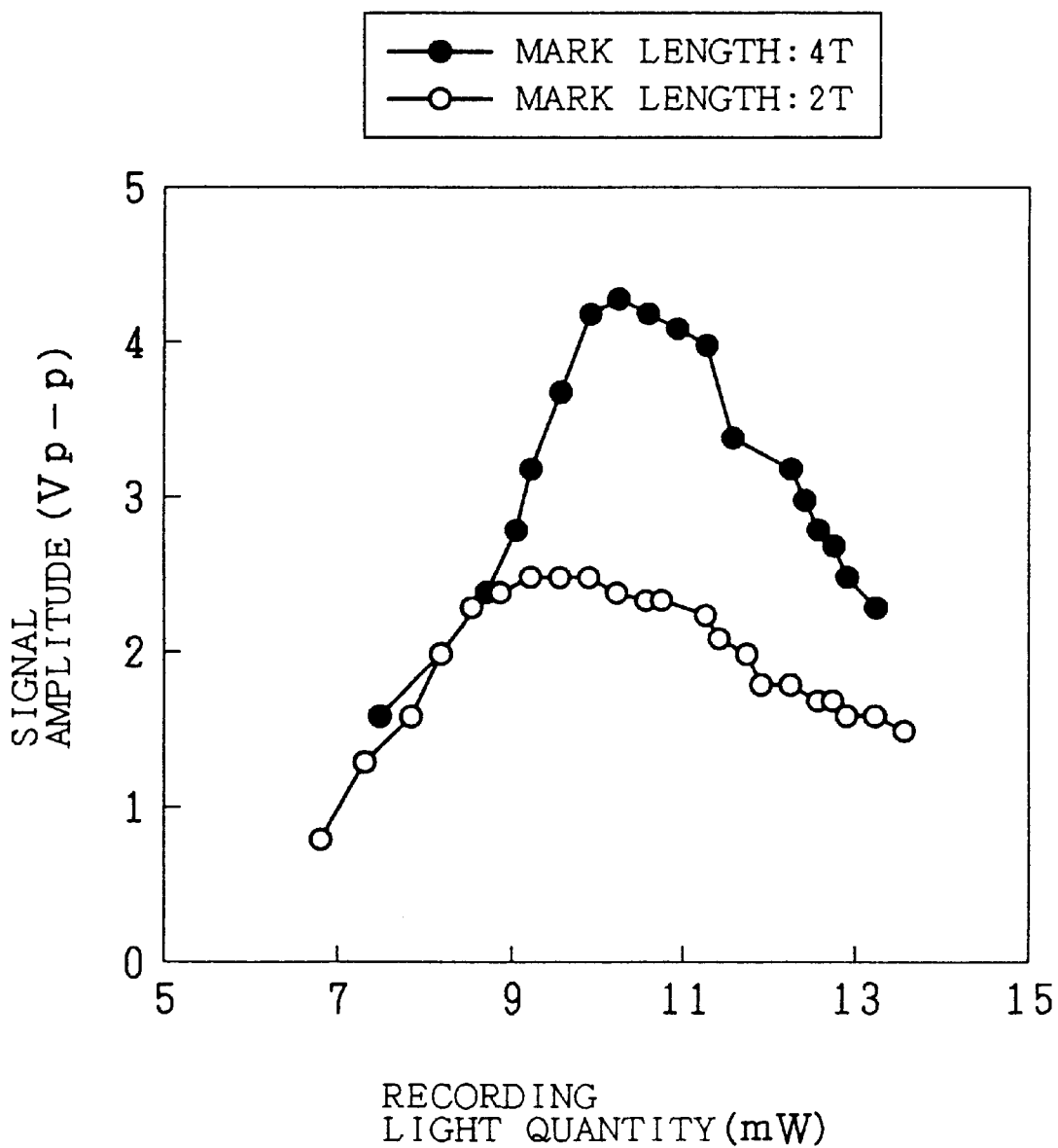
FIG. 11 is a graph illustrating a difference in signal amplitude detection sensitivity due to a difference in record mark length.

The following description will explain still another embodiment, while referring to FIG. 11. In the description on the present embodiment, a mark length and a space length applicable to the non-reverse pattern and the reverse pattern of the first through third embodiments will be explained. The members having the same structure (function) as those in the first through third embodiments will be designated by the same reference numerals and their description will be omitted.

FIG. 11 shows how the signal amplitude varies with the recording light quantity, in cases of two different mark and space lengths which are applied to the non-reverse pattern and the reverse pattern. In the present embodiment, a wavelength λ of a light beam from a laser light source is 635 nm, a numerical aperture NA of an objective lens is 0.6, and a data bit length T is 0.235 μm.

As shown in FIG. 11, changes in the signal amplitude in response to changes in the recording light quantity can be detected in the case where the mark length and the space length are 2 T (0.47 μm) each. In the case where the mark length and the space length are 4 T (0.94 μm), the signal amplitude varies more greatly, thereby allowing an optimal recording light quantity to be detected with high sensitivity.

Therefore, the mark length and the space length may be not less than 0.4 times a spot diameter (λ/NA≈1060 nm) each (that is, not less than 1060 nm×0.4=0.424 μm), the spot diameter being determined by the wavelength λ of the laser light source and the numerical aperture NA of the objective lens. In this case, the signal amplitude variation can be detected. More preferably, the mark length and the space length may be not less than 0.8 times the spot diameter each (that is, not less than 1060 nm×0.8=0.848 μm). In this case, the signal amplitude varies more greatly, thereby allowing the signal amplitude variation to be detected without failure. Therefore, the mark length and the space length applicable to the non-reverse and reverse patterns, which are represented as L each, preferably satisfy the following relationship:

$$L \geq 0.4 \times (\lambda/NA)$$

Further, the mark length and the space length more preferably satisfy the following relationship:

$$L \geq 0.8 \times (\lambda/NA)$$

The optimal recording light quantity can be obtained with high sensitivity also in the case where the mark length and the space length differ. They are, however, preferably equal, since in this case direct current components in the signal are reduced to zero, whereby the signal quantity can be detected with high precision when the signal amplitude (alternate current components) is detected.

Fifth Embodiment

The following description will explain still another embodiment, while referring to FIGS. 12 through 17. For conveniences' sake, the members having the same structure (function) as those in the first through fourth embodiments will be designated by the same reference numerals and their description will be omitted.

Figure 12:
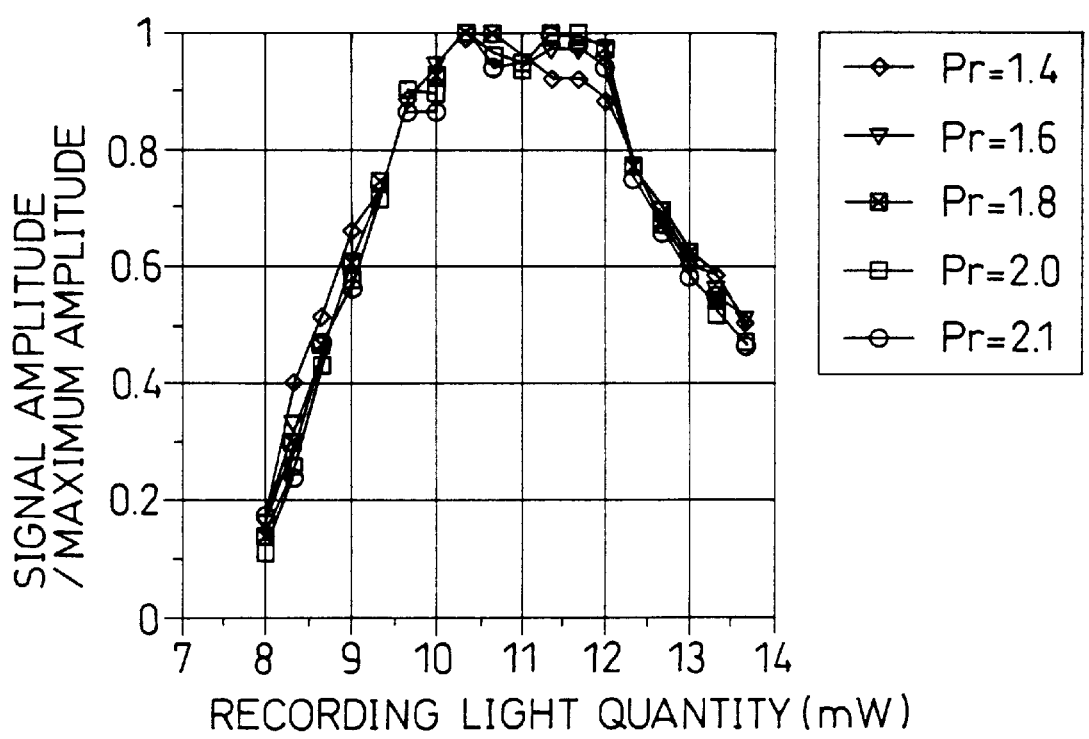
FIG. 12 is a graph illustrating how the signal amplitude varies with the recording light quantity, as well as reproducing light quantity dependency of detection sensitivity.

A reproducing light quantity Pr was varied in a range of 1.4 mW to 2.1 mW while the recording light quantity was optimized, and respective signal amplitudes with respect to the reproducing light quantities were detected. The detection result is shown in FIG. 12. The vertical axis indicates a signal amplitude divided by a maximum amplitude for standardization. From the graph, it is found that the signal amplitude hardly varies when the reproducing light quantity is varied. In short, the control of the recording light quantity does not depend on the reproducing light quantity variation.

Figure 13:
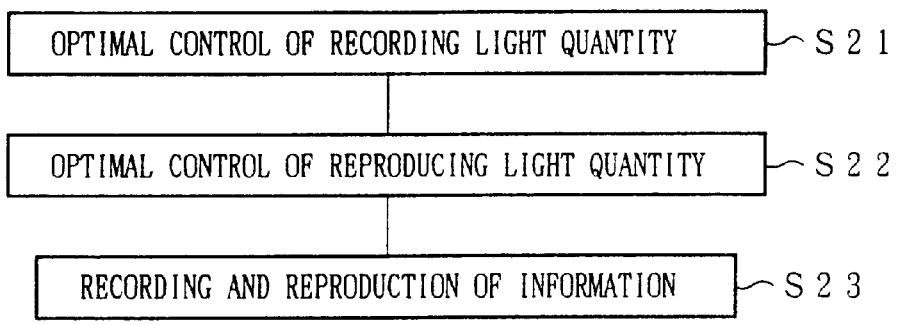
FIG. 13 is a flowchart illustrating a flow of an operation in accordance with an embodiment of the present invention.

In the present embodiment, as shown in FIG. 13, the recording light quantity optimizing control which does not depend on the reproducing light quantity is performed (S21), and subsequently, the reproducing light quantity optimizing control is performed (S22). By doing so, the recording light quantity and the reproducing light quantity can be optimally controlled together. By executing information recording and reproduction thereafter (S23), reproduction errors are reduced, and high-density recording and reproduction is enabled.

The step S21 is completely identical to the steps explained in the description on the second embodiment (all the steps in the flowchart of FIG. 6). Therefore, the description thereof is omitted here. At the step S10 in the flowchart of FIG. 6, the CPU 46 sequentially records a signal amplitude with respect to each recording light quantity, finds such a recording light quantity as causes the signal amplitude to become maximum, so that it is used as the optimal recording light quantity. However, in the case where a plurality of such recording light quantities as causes the signal amplitude to become maximum are found, as shown in FIG. 12, a mean value in such a light quantity range as an amplitude at or above a certain level can be obtained is selected so as to be used as the optimal recording light quantity.

Figure 14:
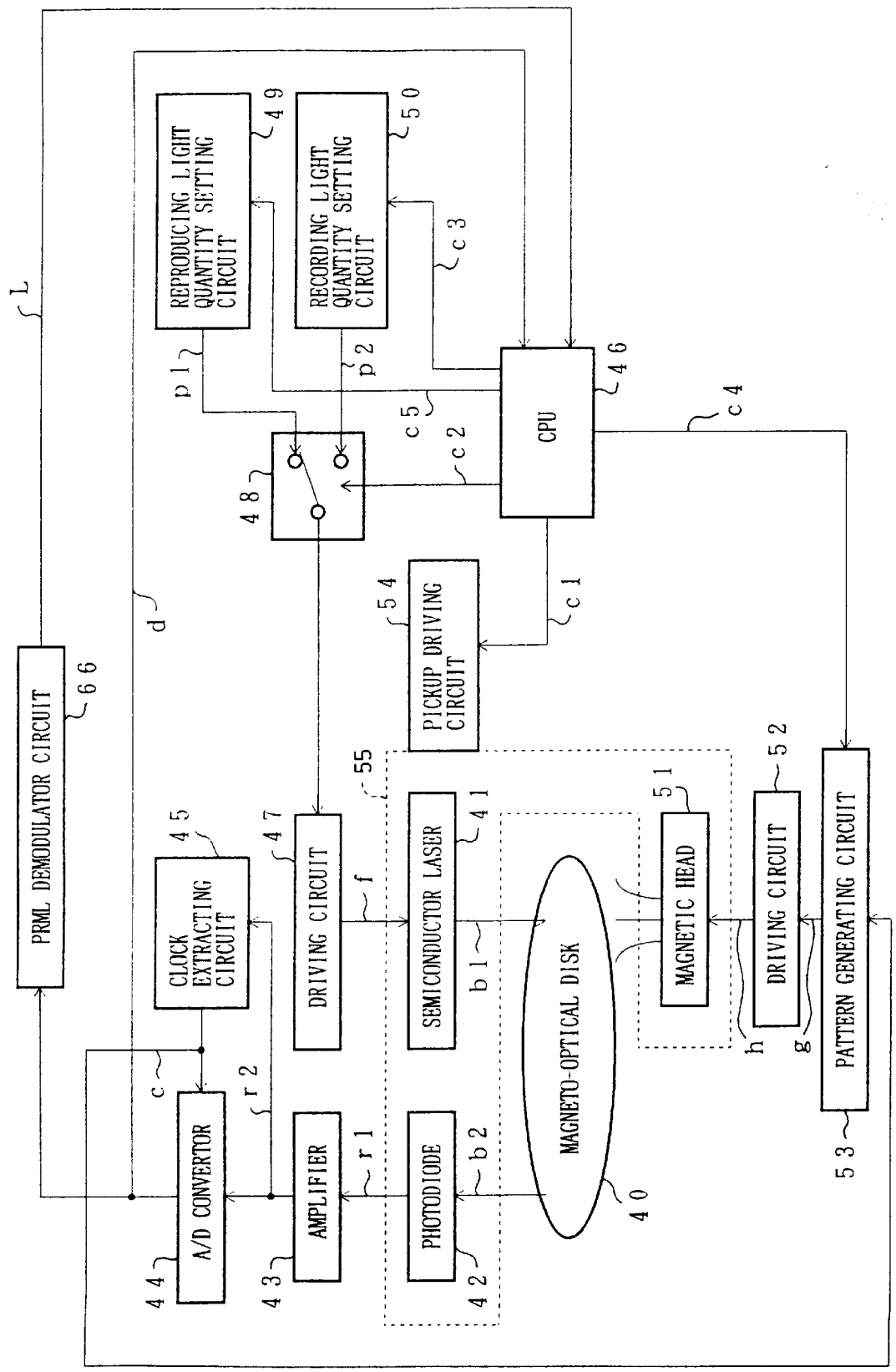
FIG. 14 is a block diagram illustrating another schematic arrangement of the recording condition control device of the present invention for use in an optical recording apparatus.

Furthermore, a device of the present invention which performs the aforementioned control has an arrangement shown in FIG. 14. The arrangement and the operation of the device of the present embodiment is identical to that of the device of the second embodiment shown in FIG. 4, except that in the device of the present embodiment, a digital signal d produced by the AD converter 44 is supplied to the CPU 46 directly and through a PRML demodulator circuit 66. The PRML demodulator circuit 66 produces demodulation data L in accordance with the digital signal d, and sends the data L to the CPU 46.

The following description will explain the recording light quantity optimizing control (S22) shown in FIG. 13.

Figure 15:
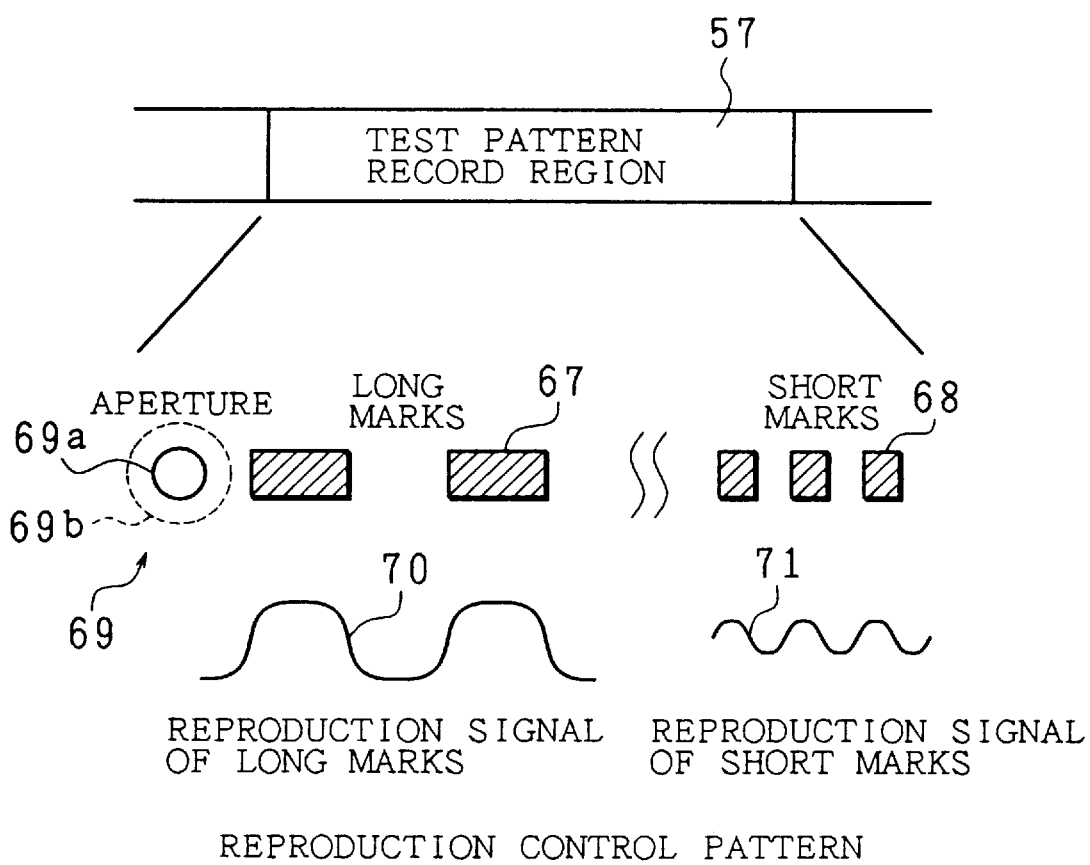
FIG. 15 is an explanatory view illustrating a reproduction control pattern.
Figure 16:
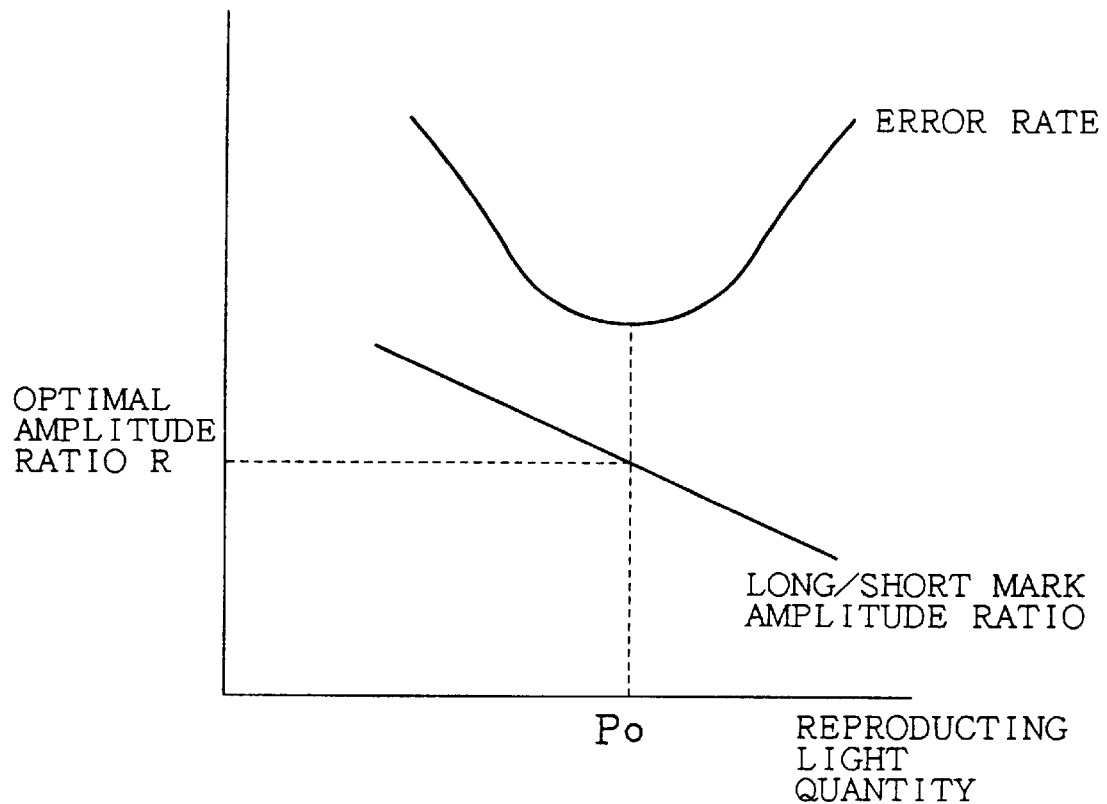
FIG. 16 is a graph illustrating how an amplitude ratio of long and short marks in the reproduction control pattern varies with the reproducing light quantity, and how an error rate varies with the reproducing light quantity.

FIGS. 15 and 16 illustrate relationship between an amplitude ratio between long and short marks and a reproducing light quantity. As shown in FIG. 15, a reproduction control pattern composed of long marks 67 and short marks 68 is recorded in a test pattern record region with the aforementioned optimal recording light quantity, and a light beam having a reproducing light quantity is projected to the pattern. As a result, an aperture (detection aperture) 69 is formed as shown in FIG. 15. The detection aperture 69 has a smaller size indicated by a solid line 69$a$ when the reproducing light quantity is small, whereas it has a greater size indicated by a broken line 69$b$ when the reproducing light quantity is great. When the long marks 67 each of which is longer than the detection aperture 69 and the short marks 68 each of which is shorter than the detection aperture 69 are reproduced, a reproduction signal 70 with a great amplitude is obtained form the long marks 67, whereas a reproduction signal 71 with a small amplitude is obtained from the short marks 68. An amplitude ratio (long/short mark amplitude ratio) between the reproduction signal 70 of the long marks and the reproduction signal 71 of the short marks becomes smaller as the reproducing light quantity is increased, as shown in FIG. 16. An error rate of reproduction data becomes minimum when the reproducing light quantity is $P_0$.

The CPU 46 shown in FIG. 14 sends a control command c5 to the reproducing light quantity setting circuit 49, to gradually increase the reproducing light quantity. The CPU 46 (error detecting means) measures a current amplitude ratio from the digital signal d as an output signal from the A/D converter 44, and measures an error rate from modulation data L supplied from the PRML demodulator circuit 66. Then, the CPU 46 searches the error rates thus measured for the minimum one, and selects as the optimal amplitude ratio an amplitude ratio R which corresponds to the reproducing light quantity $P_0$ with which the minimum error rate is obtained. Thereafter, the CPU 46 measures only an amplitude ratio from the output signal of the A/D converter 44, and controls the reproducing light quantity so that the measured amplitude ratio approximates to the optimal amplitude ratio R. Thus, the reproducing light quantity control for minimizing the error rate of the reproduction data is performed.

The aforementioned pickup 55 constitutes reproduction control pattern recording means. The photodiode 42, the amplifier 43, the A/D converter 44, and the CPU 46 constitute reproduction signal amplitude detecting means.

Figure 17:
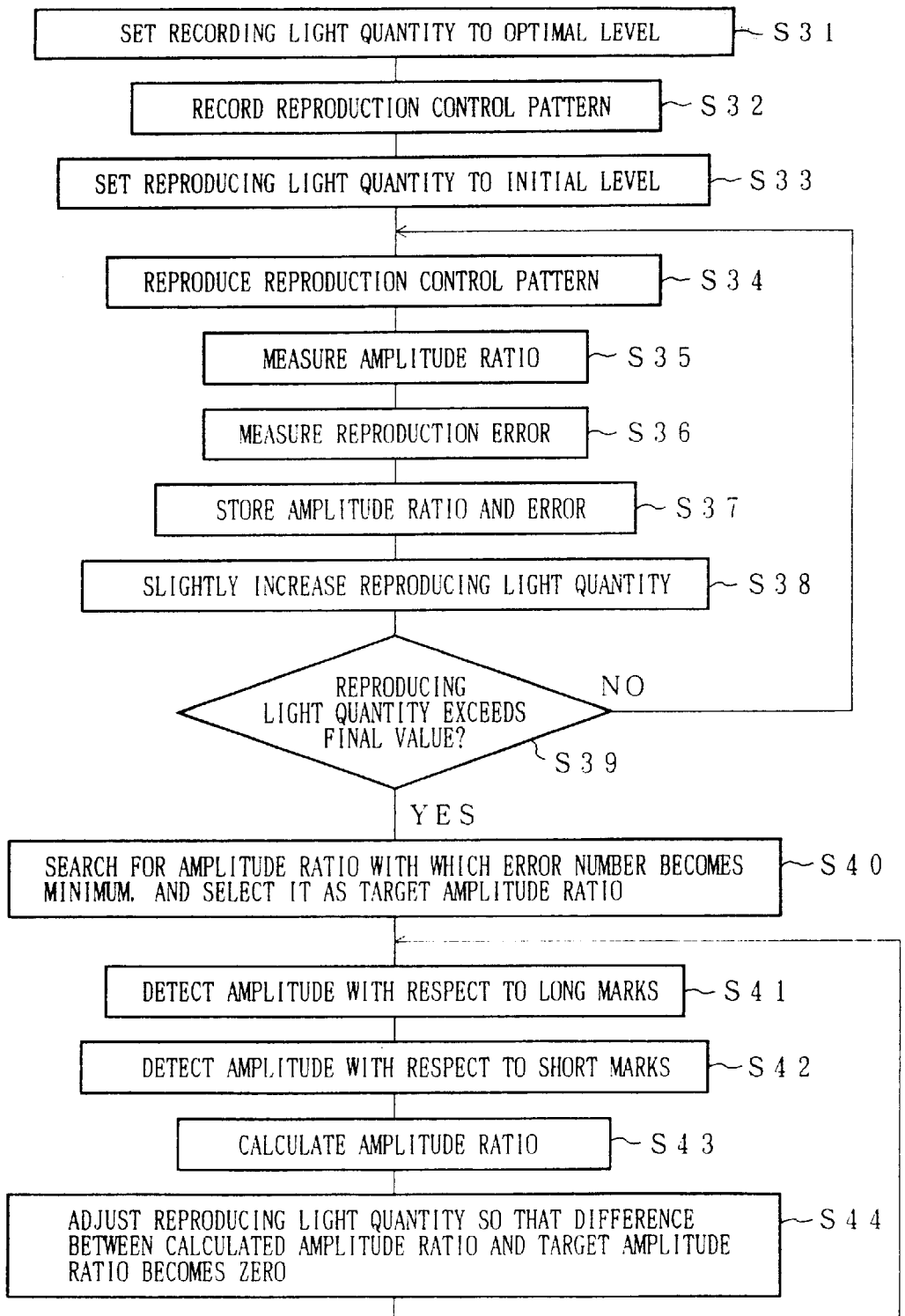
FIG. 17 is a flowchart illustrating a flow of a reproducing light quantity optimizing operation.

FIG. 17 is a flowchart explaining in detail the reproducing light quantity optimizing control (S22) shown in FIG. 13.

Steps S31 through S40 are steps for determining a target amplitude ratio, and steps S41 through S44 are steps for controlling the reproducing light quantity.

First, the recording light quantity is set to the optimal recording light quantity level which is found at S21 (see FIG. 13) in the process for controlling the recording light quantity (S31). The reproduction control pattern is recorded in the test pattern record region of the magneto-optical disk (S32). Here, random data used for measuring errors are added to the reproduction control pattern so as to be recorded as well. The reproducing light quantity is set to an initial level (S33). The reproduction control pattern and the random data are reproduced (S34). An amplitude ratio of the reproduction control pattern is measured (S35), and subsequently an error rate of the random data is measured (S36). The amplitude ratio and the number of errors of the reproduction signal thus measured are recorded (S37). The reproducing light quantity is slightly increased (S38), and whether or not the increased reproducing light quantity exceeds a final value of a test range of the reproducing light quantity is judged (S39). In the case where the reproducing light quantity as a result of increase does not exceed the final value, the flow returns to the step S34. In the case where it exceeds the final value, the error numbers recorded are searched for the minimum error number or an error number at or below a certain value and an amplitude ratio corresponding to the error number thus searched out is selected as the target amplitude ratio (S40). Thereafter, the flow goes to a step S41, to control the reproducing light quantity based on the determined target amplitude ratio.

More specifically, an amplitude of a signal of the long marks is detected from the reproduction control pattern (S41). Then, an amplitude with respect to the short marks is detected (S42). Subsequently, a ratio between the amplitudes with respect to the long marks and those with respect to the short marks is calculated (S43). The reproducing light quantity is varied in such a manner that a difference between the amplitude ratio found by the calculation and the target amplitude ratio approximates to zero (S44). The flow returns to the step S41, and the reproducing light quantity control is repeated. Thus, by using the amplitude ratio of the reproduction signal instead of measuring the error rate, simple and accurate reproducing light quantity control is enabled.

The number of errors of the test data is measured while the reproducing light quantity is increased so that the target amplitude ratio is obtained, but the method for obtaining the target amplitude ratio should not be limited to this. Jitter of the reproduction signal may be measured, and an amplitude ratio when the jitter is minimum, or at or below a certain value, may be used as the target amplitude ratio. Since the number of errors is approximately proportional to the jitter, simple and accurate control of the reproducing light quantity can be performed in this case as well.

Thus, since the control of recording light quantity does not depend on the reproducing light quantity, it is possible to first control the recording light quantity and thereafter record the reproduction control pattern with an optimal recording light quantity, and hence, to optimally control the reproducing light quantity by reproducing the pattern.

As has been described so far, the recording condition control method of the present invention for an optical recording apparatus is characterized by comprising a first step of setting a recording condition to a plurality of predetermined levels by varying a light quantity of a light beam or a strength of an external magnetic field, a second step of recording a first test pattern on a first track on an optical recording medium, a third step of recording a second test pattern on a second track adjacent to the first track, a fourth step of reading the first test pattern on the first track and detecting a signal quantity, a fifth step of storing the recording conditions and the signal quantities by relating them each other, a sixth step of searching the signal quantities stored for one which approximates most to a predetermined value, and a seventh step of selecting as an optimal recording condition a recording condition corresponding to the signal quantity obtained through the sixth step.

By the foregoing method, the recording condition with which the signal quantity with respect to the record marks becomes maximum while crosserase due to adjacent tracks becomes minimum can be obtained. Here, the width of the record marks becomes optimal, thereby allowing high-densification of tracks.

Furthermore, the recording condition control method of the present invention for an optimal recording apparatus is preferably characterized in that the second test pattern is a reverse pattern of the first test pattern, and the recording means records the second test pattern on the adjacent track in synchronization with the first test pattern.

By this method, it is possible to detect the maximum value of the read signal with high sensitivity, whereby an optimal recording condition is obtained. Here, the signal quantity is increased since the record mark width is maximum, thereby causing crosstalk with adjacent tracks to become minimum. As a result, high-densification of tracks can be achieved.

Furthermore, the recording condition control device of the present invention for use in an optical recording apparatus is characterized by comprising projecting means for projecting a light beam onto an optical recording medium, tracking means for moving the light beam to a first track on the optical recording medium and a second track adjacent to the first track, recording means for recording a first test pattern on the first track and thereafter recording a second test pattern on the second track, signal quantity detecting means for reading the first test pattern and detecting a signal quantity of a read signal obtained, and control means for controlling a recording light quantity of the light beam or a recording magnetic field strength of an external magnetic field so that the signal quantity of the read signal becomes a predetermined value.

With this arrangement, a recording condition with which the signal quantity with respect to the record marks becomes maximum while crosserase due to adjacent tracks becomes minimum can be obtained. Here, the width of the record marks becomes optimal, thereby allowing high-densification of tracks.

Furthermore, the recording condition control device of the present invention for use in an optical recording apparatus is preferably characterized in that the second test pattern is a reverse pattern of the first test pattern, and the recording means records the second test pattern on the second track in synchronization with the first test pattern.

With this arrangement, it is possible to detect the maximum value of the read signal with high sensitivity, whereby an optimal recording condition is obtained. Here, the signal quantity is increased since the record mark width is maximum, thereby causing crosstalk with adjacent tracks to become minimum. As a result, high-densification of tracks can be achieved.

The recording condition control device of the present invention for use in an optical recording apparatus is preferably characterized in that the recording means previously records the second test pattern on the second track with a great recording light quantity or a great recording magnetic field strength, and subsequently records the first test pattern on the first track and the second test pattern on the second track while gradually increases the recording light quantity or the recording magnetic field strength from an initial value thereof which is relatively small.

With this arrangement, even with a small recording light quantity or a small recording magnetic field strength, the quantity of the signal thus read is caused to greatly vary, whereby a maximum value of the read signal can be detected with high sensitivity, and an optimal recording condition can be obtained.

Furthermore, the recording condition control device of the present invention for use in an optical recording apparatus is preferably characterized by comprising clock generating means for reading a reference mark signal from the optical recording medium on which reference marks are recorded at predetermined intervals, and generating an external clock in synchronization with the reference mark signal, wherein the recording means records the first and second test patterns in accordance with the external clock.

With this arrangement, a non-reverse pattern recorded on a track and a reverse pattern recorded on an adjacent track are recorded in accurate synchronization with each other by using the external clock. By doing so, it is possible to causes crosstalk to greatly occur, thereby causing the signal amplitude to greatly vary. As a result, an optimal recording condition can be obtained with high sensitivity.

Furthermore, the recording condition control device of the present invention for use in an optical recording apparatus is preferably characterized in that the recording means previously records a third test pattern on the first track, and subsequently records the first test pattern on the first track and thereafter the second test pattern on the second track while gradually increasing the recording light quantity or the recording magnetic field strength from an initial value thereof which is relatively small.

With this arrangement, sensitivity in detection of the signal amplitude can be improved due to a remaining test pattern after overwriting.

Furthermore, the recording condition control device of the present invention for use in an optical recording apparatus is preferably characterized in that the third test pattern is a reverse pattern of the first test pattern, and the recording means records the third test pattern on the first track in synchronization with the first test pattern.

With this arrangement, the lowering of the signal quantity due to the remaining test pattern is furthered by using the reverse pattern, and as a result, the variation of the signal amplitude can be detected with the highest sensitivity.

Furthermore, the recording condition control device of the present invention for use in an optical recording apparatus is preferably characterized in that the first, second, and third test patterns are patterns in each of which a mark and a space having the same length are cyclically repeated.

With the foregoing arrangement, direct current components of the signal are reduced to zero, whereby the signal amplitude which is an alternate current component can be detected with excellent sensitivity.

Furthermore, the recording condition control device of the present invention for use in an optical recording apparatus is preferably characterized in that the first, second, third, and fourth test patterns are patterns each of which is composed of marks and spaces having a same length L each, the length L being not less than 0.4 times a spot diameter ($\lambda/NA$) which is determined by a wavelength $\lambda$ of a light from a light source and a numerical aperture NA of an object lens.

With the foregoing arrangement, an optimal mark length or space length can be set in the non-reverse pattern and the reverse pattern, whereby record patterns allowing the highest sensitivity in detection can be obtained.

Furthermore, an optical recording medium of the present invention, which includes a test region with which a recording light quantity of a light beam or a recording magnetic field strength of an external magnetic field can be optimally controlled, is characterized by comprising a first track on which a first test pattern is recorded, a second track on which a second test pattern is recorded, the second track being adjacent to the first track, indelible reference marks used for generating an external clock, and a test pattern record region sectioned by the reference marks.

With the foregoing arrangement, the external clock in synchronization with the reference marks is generated, with which a non-reverse pattern to be recorded on a track and a reverse pattern to be recorded on an adjacent track are recorded thereon respectively in accurate synchronization with each other. By doing so, it is possible to causes crosstalk to greatly occur, thereby causing the signal amplitude to greatly vary. As a result, an optimal recording condition can be obtained with high sensitivity.

Furthermore, the optical recording medium of the present invention is preferably characterized in that the first track is either a land or a groove, and the second track is the other one.

With the foregoing arrangement, occurrence of crosstalk and crosserase in tracks arranged at high density is suppressed to a minimum degree, while record marks with a maximum width are recorded. By doing so, an optimal recording condition in the land/groove recording can be obtained.

Furthermore, a recording condition control method of the present invention for an optical recording apparatus is characterized by comprising a first step of setting a recording condition to a plurality of predetermined levels by varying a light quantity of a light beam or a strength of an external magnetic field, a second step of recording a test record pattern on an optical recording medium, a third step of setting a reproducing condition to a predetermined value, a fourth step of detecting a first signal quantity by reading the test record pattern under the reproducing condition, a fifth step of storing the recording condition and the first signal quantity by relating them with each other, a sixth step of searching the first signal quantities stored for one which approximates most to a predetermined value, a seventh step of recording a reproduction control pattern under a recording condition corresponding to the first signal quantity obtained through the sixth step, an eighth step of reproducing the reproduction control pattern and detecting a second signal quantity, and a ninth step of controlling the reproducing condition so that the second signal quantity approximates to a predetermined value.

By the foregoing method, since the recording light quantity control does not depend on the reproducing light quantity, it is possible to control the recording light quantity first, and subsequently record the reproduction control pattern with the optimal recording light quantity. Therefore, it is possible to optimally control the reproducing light quantity while reproducing the reproduction control pattern.

Furthermore, the recording condition control method of the present invention for an optical recording apparatus is preferably characterized in that the second step includes the sub-steps of recording a first test record pattern on a first track on the optical recording medium and recording a second test record pattern on a second track on the optical recording medium, the second track being adjacent to the first track.

By the foregoing method, a recording condition with which the signal quantity with respect to the record marks becomes maximum while crosserase due to adjacent tracks becomes minimum can be obtained. Here, the width of the record marks becomes optimal, whereby high-densification of tracks can be achieved.

Furthermore, the recording condition control method of the present invention for an optical recording apparatus is preferably characterized in that the second test record pattern is a reverse pattern of the first test record pattern, and the second test record pattern is recorded on the adjacent track in synchronization with the first test record pattern.

By the foregoing method, it is possible to detect the maximum value of the read signal with high sensitivity, whereby an optimal recording condition is obtained. Here, the signal quantity is increased since the record mark width is maximum, thereby causing crosstalk with the adjacent track to become minimum. As a result, high-densification of tracks can be achieved.

Furthermore, a recording condition control device of the present invention for use in an optical recording apparatus is characterized by comprising (1) projecting means for projecting a light beam onto an optical recording medium, (2) first recording means for recording a test record pattern on the optical recording medium, (3) reproducing condition fixing means for fixing a recording condition to a predetermined value, (4) first signal quantity detecting means for reading the test record pattern and detecting a first signal quantity, (5) recording condition control means for adjusting a recording light quantity or a recording magnetic field strength to a predetermined recording condition so that the first signal quantity approximates to a predetermined value, (6) second recording means for recording a reproduction control pattern on the optical recording medium under the predetermined recording condition, (7) second signal quantity detecting means for reading the reproduction control pattern and detecting a second signal quantity, and (8) reproducing condition control means for adjusting a reproducing light quantity or a reproducing magnetic field strength to a predetermined recording condition so that the second signal quantity approximates to a predetermined value.

With the foregoing arrangement, since the recording light quantity control does not depend on the reproducing light quantity, it is possible to control the recording light quantity first, and subsequently record the reproduction control pattern with the optimal recording light quantity. Therefore, it is possible to optimally control the reproducing light quantity while reproducing the reproduction control pattern.

Furthermore, the recording condition control device of the present invention for use in an optical recording apparatus is preferably characterized in that the first recording means includes means for recording a first test record pattern on a first track, and thereafter, recording a second test record pattern on a second track, and the recording condition control means reads the first test record pattern and controls the recording light quantity or the recording magnetic field strength so that the signal quantity of the read signal approximates to a predetermined value.

With the foregoing arrangement, a recording condition with which the signal quantity with respect to the record marks becomes maximum while crosserase due to adjacent tracks becomes minimum can be obtained. Here, the width of the record marks becomes optimal, thereby allowing high-densification of tracks.

Furthermore, the recording condition control device of the present invention for use in an optical recording apparatus is preferably characterized in that the second test record pattern is a reverse pattern of the first test record pattern, and the first recording means records the second test record pattern on the second track in synchronization with the first test record pattern.

With the foregoing arrangement, it is possible to detect the maximum value of the read signal with high sensitivity, whereby an optimal recording condition is obtained. Here, the signal quantity is increased since the record mark width is maximum, thereby causing crosstalk with the adjacent tracks to become minimum. As a result, high-densification of tracks can be achieved.

Furthermore, the recording condition control device of the present invention for use in an optical recording apparatus is preferably characterized in that the first recording means previously records the second test record pattern on the second track with a great recording light quantity or a great recording magnetic field strength, then records the first test record pattern on the first track and thereafter the second test record pattern on the second track while gradually increasing the recording light quantity or the recording magnetic field strength from an initial value which is relatively small.

With the foregoing arrangement, even with a small recording light quantity or a small recording magnetic field strength, the quantity of the signal thus read by utilizing crosstalk is caused to greatly vary, whereby a maximum value of the read signal can be detected with high sensitivity, and an optimal recording condition can be obtained.

Incidentally, the above description explains the embodiments of the present invention applied to the magneto-optical recording, but the invention is not limited to these embodiments. It is possible to apply the present invention to the phase change recording as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording condition control method for an optical recording apparatus, comprising the steps of:
   (1) setting a plurality of recording conditions differing in a light quantity of a light beam or a strength of an external magnetic field;
   (2) recording a test pattern on an optical recording medium under the different recording conditions;
   (3) reading the test pattern and detecting an amplitude of a read signal with respect to each recording condition; and
   (4) determining an optimal recording condition based on the amplitudes which are respectively obtained with respect to the recording conditions,
   wherein said step (2) includes the sub-steps of:
      (2a) recording a first test pattern on a first track of the optical recording medium; and
      (2b) recording a second test pattern at least one of two second tracks adjacent to the first track.

2. The method as set forth in claim 1, wherein in said step (3), the first test pattern is read, with respect to each recording condition.

3. The method as set forth in claim 1, wherein in said step (4), a recording condition when the read signal has a maximum amplitude is selected as the optimal recording condition, from among the recording conditions.

4. The method as set forth in claim 1, wherein the second test pattern is an erasure pattern.

5. The method as set forth in claim 4, wherein in said step (4), a recording condition when a side of the first test pattern on the second track side comes into contact with a side of the erasure pattern on the first track side is selected as the optimal recording condition.

6. The method as set forth in claim 1, wherein said step (4) includes the sub-steps of:

(4a) storing the recording conditions and the amplitudes by relating them with each other;

(4b) searching the amplitudes stored for one which approximates most to a predetermined value; and (4c) selecting a recording condition corresponding to the amplitude obtained through said sub-step (4b) as the optimal recording condition.

7. The method as set forth in claim 1, wherein the second test pattern is a reverse pattern of the first test pattern.

8. The method as set forth in claim 7, wherein the second test pattern is recorded in synchronization with the first test pattern.

9. The method as set forth in claim 1, further comprising the step of:

(5) recording a third test pattern on at least one of the two second tracks, under a recording condition of a greater light quantity of the light beam or a greater strength of the external magnetic field than that in said step (2), wherein said step (5) is executed before said step 2.

10. The method as set forth in claim 9, wherein the third test pattern is a reverse pattern of the first test pattern.

11. The method as set forth in claim 10, wherein the third test pattern is recorded in synchronization with the first test pattern.

12. The method as set forth in claim 1, further comprising the step of:

(6) recording a fourth test pattern on the first track, under a recording condition of a greater light quantity of the light beam or a greater strength of the external magnetic field than that in said step (2), wherein said step (6) is executed before step (2a).

13. The method as set forth in claim 12, wherein the fourth test pattern is a reverse pattern of the first test pattern.

14. The method as set forth in claim 13, wherein the fourth test pattern is recorded in synchronization with the first test pattern.

15. The method as set forth in claim 9, wherein the first, second, and third test patterns are patterns in each of which a mark and a space having the same length are cyclically repeated.

16. The method as set forth in claim 1, wherein at least either the first test pattern or the second test pattern is composed of marks and spaces having a length length L satisfying:

$$L \approx 0.4 \times (\lambda/NA)$$

where $\lambda$ and NA represent a wavelength of the light beam and a numerical aperture of an object lens, respectively.

17. The method as set forth in claim 9, wherein the third test pattern is composed of marks and spaces having a length L each, the length L satisfying:

$$L \geq 0.4 \times (\lambda/NA)$$

where $\lambda$ and NA represent a wavelength of the light beam and a numerical aperture of an object lens, respectively.

18. The method as set forth in claim 16, wherein the length L satisfies:

$$L \geq 0.8 \times (\lambda/NA).$$

19. The method as set forth in claim 17, wherein the length L satisfies:

$$L \geq 0.8 \times (\lambda/NA).$$

20. The method as set forth in claim 1, further comprising the steps of:

(7) recording a reproduction control pattern on the optical recording medium under the optimal recording condition determined;

(8) determining an optimal reproducing condition based on amplitudes which are obtained by reproducing the reproduction control pattern.

21. The method as set forth in claim 20, wherein:

the reproduction control pattern includes long marks and short marks; and said step (8) is a step of determining a ratio between an amplitude of the reproduction signal with respect to the long marks and an amplitude of the reproduction signal with respect to the short marks, and controlling the reproducing condition so that the amplitude ratio approximates to a predetermined target amplitude ratio.

22. A recording condition control device for use in an optical recording apparatus, said device comprising:

recording condition setting means for setting a plurality of recording conditions by varying a recording light quantity of a light beam or a strength of a recording magnetic field;

recording means for recording a test pattern on an optical recording medium by projecting said light beam onto said optical recording medium under a predetermined recording condition;

amplitude detecting means for reading the test pattern with respect to each recording condition, and detecting each amplitude of a read signal; and optimal recording condition determining means for determining an optimal recording condition, based on the amplitudes which are respectively detected with respect to the recording conditions, wherein:

said recording means records a first test pattern on a first track on said optical recording medium under a predetermined recording condition, and records a second test pattern on at least one of two second tracks adjacent to the first track; and said amplitude detecting means reads the first test pattern with respect to each recording condition.

23. The device as set forth in claim 22, wherein said optimal recording condition determining means selects a recording condition when the read signal has a maximum amplitude as the optimal recording condition, among the recording conditions.

24. The device as set forth in claim 22, wherein the second test pattern is an erasure pattern.

25. The device as set forth in claim 24, wherein said optimal recording condition determining means selects as the optimal recording condition a recording condition when a side of the first test pattern on the second track side comes into contact with a side of the erasure pattern on the first track side.

26. The device as set forth in claim 22, wherein said optimal recording condition determining means controls the recording light quantity of the light beam or the strength of the recording magnetic field so that the amplitude of the read signal approximates to a predetermined value.

27. The device as set forth in claim 22, wherein the second test pattern is a reverse pattern of the first test pattern.

28. The device as set forth in claim 27, wherein said recording means records the second test pattern in synchronization with the first test pattern.

29. The device as set forth in claim 22, wherein, before recording the first test pattern on the first track, said recording means records a third test pattern on at least one of the two second tracks, under a recording condition of a greater light quantity of the light beam or a greater strength of the external magnetic field than that for recording the first test pattern on the first track.

30. The device as set forth in claim 29, wherein the third test pattern is a reverse pattern of the first test pattern.

31. The device as set forth in claim 30, wherein said recording means records the third test pattern in synchronization with the first test pattern.

32. The device as set forth in claim 29, wherein, before recording the first test pattern on the first track, said recording means records a fourth test pattern on the first track, under a recording condition of a greater light quantity of the light beam or a greater strength of the external magnetic field than that for recording the first test pattern on the first track.

33. The device as set forth in claim 32, wherein the fourth test pattern is a reverse pattern of the first test pattern.

34. The device as set forth in claim 33, wherein said recording means records the fourth test pattern in synchronization with the first test pattern.

35. The device as set forth in claim 29, wherein the first, second, and third test patterns are patterns in each of which a mark and a space having the same length are cyclically repeated.

36. The device as set forth in claim 22, wherein:
said recording means includes projecting means for projecting a light beam onto an optical recording medium, and an objective lens for converging the light beam to the optical recording medium; and
at least either the first test pattern or the second pattern is composed of marks and spaces having a length L each, the length L satisfying:

$$L \geq 0.4 \times (\lambda/NA)$$

where $\lambda$ and NA represent a wavelength of the light beam and a numerical aperture of an object lens, respectively.

37. The device as set forth in claim 29, wherein:
said recording means includes projecting means for projecting a light beam onto an optical recording medium, and an objective lens for converging the light beam to the optical recording medium; and
the third patterns is composed of marks and spaces having a length L each, the length L satisfying:

$$L \geq 0.4 \times (\lambda/NA)$$

where $\lambda$ and NA represent a wavelength of the light beam and a numerical aperture of an object lens, respectively.

38. The method as set forth in claim 36, wherein the length L satisfies:

$$L \geq 0.8 \times (\lambda/NA).$$

39. The method as set forth in claim 37, wherein the length L satisfies:

$$L \geq 0.8 \times (\lambda/NA).$$

40. The device as set forth in claim 22, further comprising clock generating means for reading a reference mark signal from said optical recording medium on which reference marks are recorded at predetermined intervals, and generating an external clock in synchronization with the reference mark signal,
wherein said recording means records the first and second test patterns in accordance with the external clock.

41. The device as set forth in claim 22, further comprising:
reproduction control pattern recording means for recording a reproduction control pattern on said optical recording medium under the optimal recording condition determined;
control means for controlling a reproducing light quantity or a reproducing magnetic field strength; and
reproduction signal amplitude detecting means for detecting an amplitude obtained when the reproduction control pattern is reproduced, wherein said control means determines an optimal reproducing condition based on the amplitudes.

42. The device as set forth in claim 41, wherein said control means controls the reproducing condition so that the amplitude of the reproduction signal approximates to a predetermined value.

43. The device as set forth in claim 42, wherein:
the reproduction control pattern includes long marks and short marks; and
said control means determines a ratio between an amplitude of the reproduction signal with respect to the long marks and an amplitude of the reproduction signal with respect to the short marks, and controlling the reproducing condition so that the amplitude ratio approximates to a predetermined target amplitude ratio.

* * * * *